United States Patent [19]

Kurosawa et al.

[11] Patent Number: 5,283,826
[45] Date of Patent: Feb. 1, 1994

[54] SYSTEM USING A PORTABLE CALL INFORMATION DEVICE

[75] Inventors: Yuji Kurosawa, Kawasaki; Shingo Isozaki, Yokohama, both of Japan

[73] Assignee: Canon Kabushiki Kaisha, Tokyo, Japan

[21] Appl. No.: 961,034

[22] Filed: Oct. 14, 1992

Related U.S. Application Data

[63] Continuation of Ser. No. 538,888, Jun. 15, 1990, abandoned.

[30] Foreign Application Priority Data

| Jun. 16, 1989 | [JP] | Japan | 1-154163 |
| Jun. 22, 1989 | [JP] | Japan | 1-160317 |
| Jul. 5, 1989  | [JP] | Japan | 1-173702 |
| Oct. 5, 1989  | [JP] | Japan | 1-261876 |

[51] Int. Cl.⁵ .................................. H04M 1/274
[52] U.S. Cl. ............................ 379/357; 379/355; 379/90
[58] Field of Search ............. 379/110, 32, 100, 91, 379/357, 354, 355, 90

[56] References Cited

U.S. PATENT DOCUMENTS

| 4,126,768 | 11/1978 | Grenzow | 379/357 |
| 4,130,738 | 12/1978 | Sandstedt | 340/825.31 |
| 4,456,925 | 6/1984 | Skerbs et al. | 379/110 |
| 4,742,351 | 5/1988 | Suzuki | 340/825.34 |
| 4,766,433 | 8/1988 | Herman et al. | 179/90 |
| 4,961,217 | 10/1990 | Akiyama | 379/89 |

FOREIGN PATENT DOCUMENTS

| 0115240 | 8/1984 | European Pat. Off. |
| 0173813 | 12/1986 | European Pat. Off. |
| 59-110258 | 6/1984 | Japan |
| 61-184955 | 8/1986 | Japan |
| 62-086956 | 4/1987 | Japan |
| 63-104556 | 10/1988 | Japan |
| 63-006946 | 12/1988 | Japan |

Primary Examiner—James L. Dwyer
Assistant Examiner—Ahmad F. Matar
Attorney, Agent, or Firm—Fitzpatrick, Cella, Harper & Scinto

[57] ABSTRACT

Call generating apparatus connected to a call communication line by a connection unit generates a call to the communication line according to information received from a portable device mounted thereon. The connection unit disconnects the connected call connection line if the portable device is unmounted during reception of the information. A permission signal may be sent to the portable device to permit transmission of the information.

26 Claims, 26 Drawing Sheets

FIG. 22
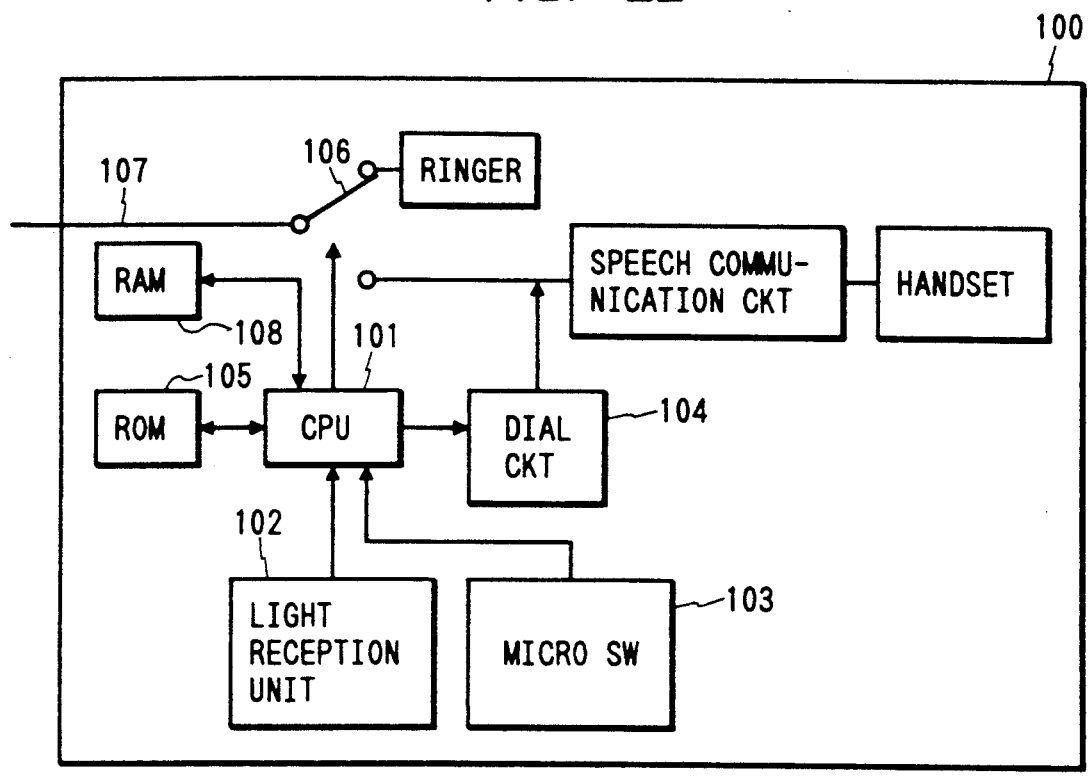
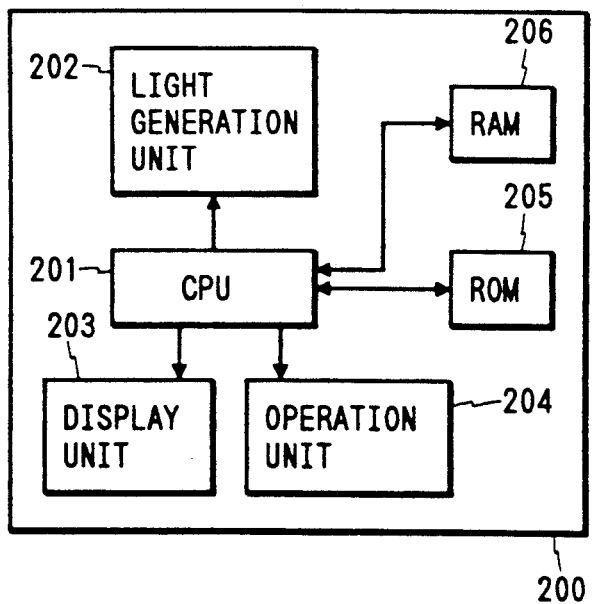

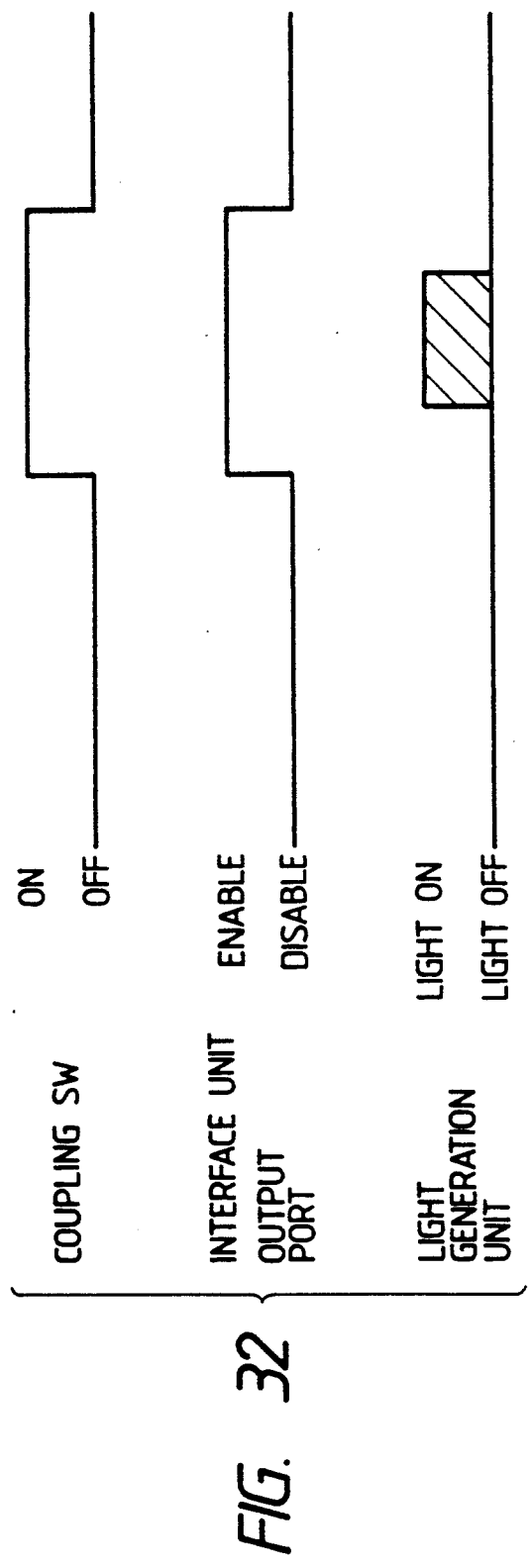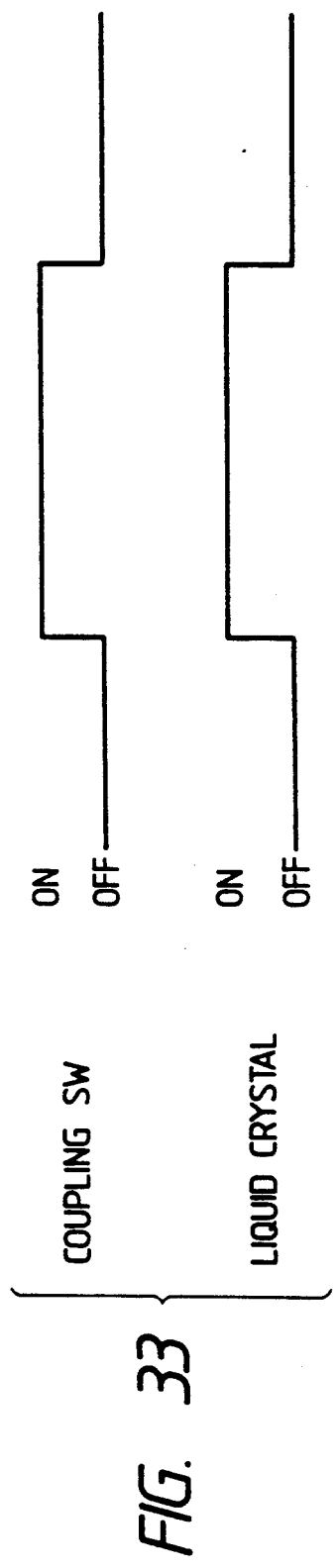

SYSTEM USING A PORTABLE CALL INFORMATION DEVICE

This application is a continuation of application Ser. No. 07/538,888 filed Jun. 15, 1990, now abandoned.

BACKGROUND OF THE INVENTION

1. Field of the Invention

The present invention relates to a system comprising a portable system storing data such as a telephone number, and an apparatus utilizing data stored in the portable device.

2. Description of the Related Art

A so-called electronic telephone directory which stores sets of telephone numbers and names has been utilized. Some electronic telephone directories output registered telephone numbers as PB tones. An operator sets an electronic telephone directory near a handset of a telephone set, and causes the electronic telephone directory to output PB tones, thereby generating a call.

However, a wrong destination is often called due to environmental noise.

SUMMARY OF THE INVENTION

It is an object of the present invention to improve a call generation apparatus.

It is another object of the present invention to disconnect a line when a call generation operation cannot be satisfactorily performed.

It is still another object of the present invention to provide a call generation apparatus which has good operability.

It is still another object of the present invention to improve a call generation apparatus which utilizes a portable device.

It is still another object of the present invention to prevent wasteful power consumption of a portable device.

It is still another object of the present invention to improve operability of a portable device.

The above and other objects of the present invention will be apparent from the description of the preferred embodiments.

BRIEF DESCRIPTION OF THE DRAWINGS

FIG. 22 is a block diagram of the eighth embodiment;

FIG. 32 is a timing chart of the twelfth embodiment;

FIG. 33 is a timing chart of the thirteenth embodiment;

DETAILED DESCRIPTION OF THE PREFERRED EMBODIMENTS

First Embodiment

In this embodiment, when a card-like electronic telephone directory is mounted on a telephone set, and a line is disconnected, a light reception element is inhibited from fetching information, thereby preventing an erroneous operation caused by external light.

Figure 1:
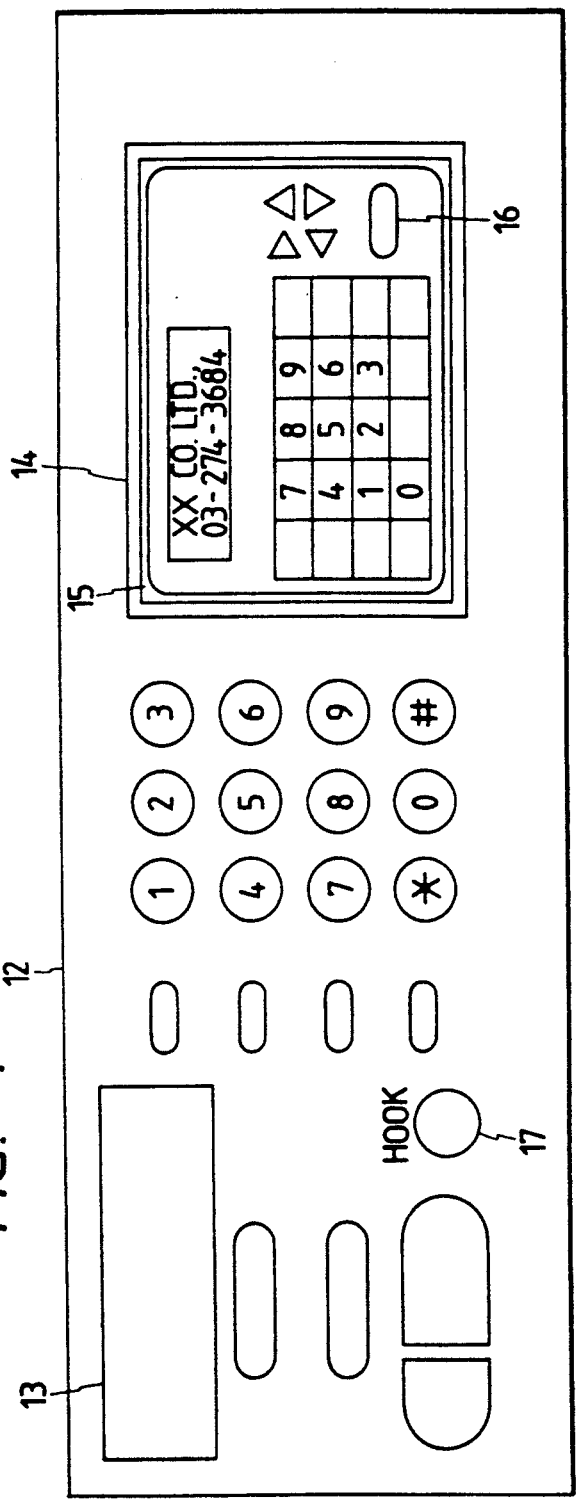
FIG. 1 is a plan view of an operation unit according to the first embodiment of the present invention.

This embodiment exemplifies a case wherein a card-like electronic telephone directory (card) is mounted on a facsimile apparatus. FIG. 1 is a view showing a state wherein the card is mounted on an operation unit (operation panel), FIG. 2 is a sectional view of a card mounting portion, FIG. 3 is a block diagram of the facsimile apparatus, and FIG. 4 is a flow chart showing an operation of this embodiment.

In FIG. 1, an operation unit 12 has a display unit 13, a card mounting portion 14, and an on-hook button 17. A card 15 has a transfer button 16.

Figure 2:
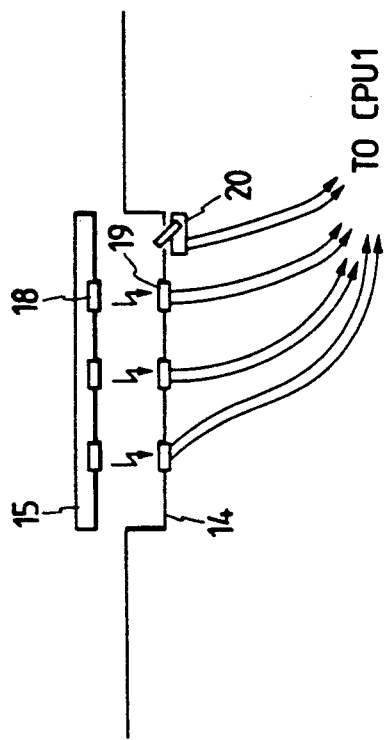
FIG. 2 is a sectional view of a card mounting portion of the first embodiment.

In FIG. 2, light generation elements 18 are arranged on the lower surface of the card 15, and light reception elements 19 are arranged on the bottom surface of the card mounting portion 14. A microswitch 20 is also arranged on the bottom surface of the card mounting portion 14.

Figure 3:
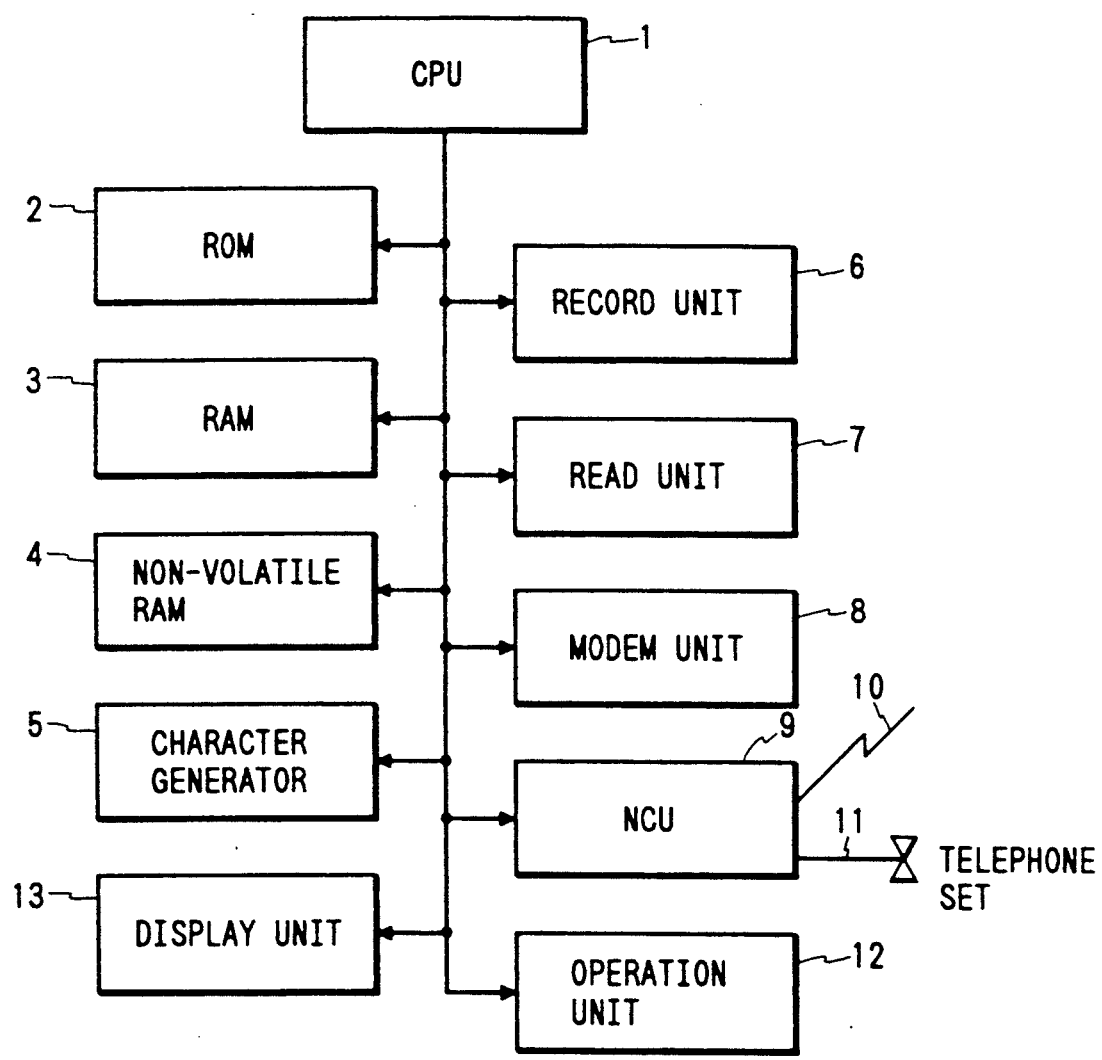
FIG. 3 is a block diagram of a facsimile apparatus of the first embodiment.
Figure 4:
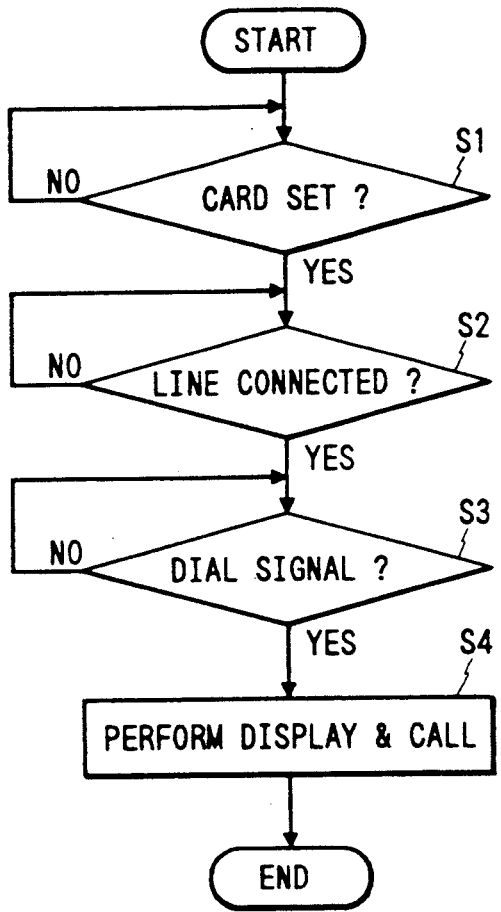
FIG. 4 is a flow chart of the first embodiment.

In FIG. 3, a CPU (central processing unit) 1 controls the overall facsimile apparatus, i.e., a RAM (random access memory) 3, a non-volatile RAM 4, a character generator (CG) 5, a record unit 6, a read unit 7, a modem unit 8, a network control unit (NCU) 9, the operation unit 12, and the display unit 13 according to a program stored in a ROM (read-only memory) 2.

The RAM 3 stores binary image data read by the read unit 7 or binary image data to be recorded by the record unit 6. The RAM 3 also stores binary image data which is modulated by the modem unit 8 and is to be output onto a telephone line 10 via the NCU 9. The RAM 3 stores an analog waveform input from the telephone line 10 via the NCU 9 and demodulated by the modem unit 8 as binary data.

The non-volatile RAM 4 can reliably store data to be preserved even when the power switch of the facsimile apparatus is kept OFF. The non-volatile RAM 4 is one of registration means for registering destination names and destination telephone numbers input from the operation unit 12 in correspondence with each other.

The CPU 1 transmits a destination name according to an input destination telephone number to a destination receiver on the basis of the program stored in the ROM 2.

The character generator 5 is a ROM for storing character data such as JIS codes, ASCII codes, and the like, and the CPU 1 reads out corresponding character data using 2-byte data, as needed.

The record unit 6 records and outputs recording data read out from the RAM 3 as a hard copy under the control of the CPU 1.

The read unit 7 binarizes data read by utilizing CCDs, and sequentially supplies binary data to the RAM 3 under the control of the CPU 1. Note that an original loading state of the read unit 7 can be detected by an original sensor such as a photosensor arranged along a convey path of an original. An original detection signal is input to the CPU 1.

The modem unit 8 modulates transmission data stored in the RAM 3 under the control of the CPU 1, and outputs the modulated data onto the telephone line 10 via the NCU 9. The modem unit 8 receives an analog signal on the telephone line 10 via the NCU 9, demodulates and binarizes the received signal, and stores the binary data in the RAM 3.

The NCU 9 selectively connects the telephone line to the modem unit 8 and a telephone set 11 under the control of the CPU 1.

The telephone set 11 is integrated with the facsimile apparatus. More specifically, the telephone set 11 comprises a handset, a speech network, a dialer, a ten-key pad, and the like.

The operation unit 12 includes a key for starting image transmission or reception, a mode selection key for designating an operation mode, e.g., a fine, standard, automatic reception modes, and the like during transmission/reception, a dialing ten-key pad, and the like. The CPU 1 detects depression states of these keys, and controls the corresponding units according to the detected states.

Furthermore, the operation unit 12 of this embodiment comprises the light reception elements 19 and the microswitch 20 shown in FIG. 2.

The display unit 13 comprises a 16-digit liquid crystal display, and displays predetermined characters and the like under the control of the CPU 1. The display unit 13 is arranged on the operation unit 12.

The operation of this embodiment will be described below with reference to FIG. 4.

When a call generation operation is performed using the card, an operator sets the card on the mounting portion 14. Since the microswitch 20 shown in FIG. 2 then falls down, the CPU 1 can detect through the operation unit 12 that the card is set (step S1). When a line is connected by picking up a handset of the telephone set 11 or depressing the on-hook button 17 (step S2), the CPU 1 detects through the NCU 9 that the line is connected. In this state, the CPU 1 detects whether or not light is incident on the light reception elements 19 at predetermined intervals (step S3).

The card searches a destination to be called on the display unit of the card (the card may be set on the card mounting portion 14 after the destination is searched in advance, as shown in FIG. 1), and the transfer button 16 is depressed. The light generation elements 18 corresponding to numbers "0" to "9" arranged on the lower surface of the card are turned on according to dial data. At that time, the light reception elements 19 of the telephone set corresponding to numbers "0" to "9" respond. Thus, upon scanning the light reception elements, when the CPU 1 detects an ON light reception element, it immediately stores a number corresponding to the ON light reception element in the RAM 3, and also stores the following data in the RAM 3. The CPU 1 causes the display unit 13 to display the input data using the CG 5. After all the dial data are received, the CPU 1 performs call generation processing according to the numbers stored in the RAM 3 (step S4).

When no card is mounted and when the line is disconnected even if the card is mounted, the CPU 1 does not detect the states of the light reception elements 19.

As described above, when the card is mounted on the telephone set and the line is disconnected, the light reception elements of the telephone set are inhibited from fetching light information, thereby preventing an erroneous operation caused by external light.

When the line is not connected in step S2 and when a dial signal is sent from the card 15, the CPU 1 displays a message "Please off-hook" on the display unit 13.

In step S4, the CPU 1 performs call generation processing after all the dial data are received. Every time one digit of the number is received, a dial signal may be sequentially transmitted onto a line.

Second Embodiment

In this embodiment, line connection is performed by detecting that a card is arranged on a predetermined portion of a telephone set in addition to the arrangement of the first embodiment.

Figure 5:
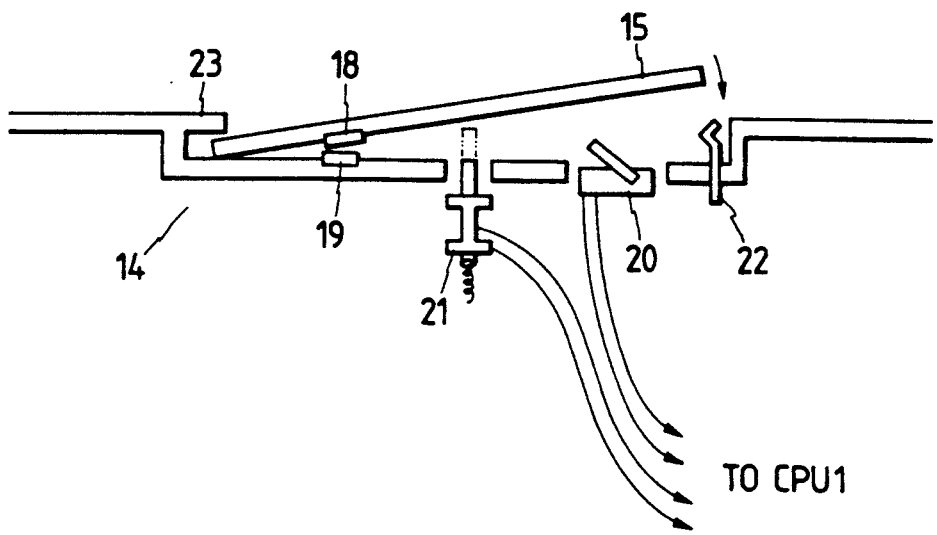
FIG. 5 is a sectional view of a card mounting portion according to the second embodiment of the present invention.

The arrangement of the facsimile apparatus of this embodiment is common to that shown in FIGS. 1 and 3. FIG. 5 is a sectional view of a card mounting portion 14 of this embodiment. The card mounting portion 14 has a plunger 21, an elastic member 22 such as a spring, and an engaging portion 23 in addition to light reception elements 19 and a microswitch 20.

Figure 6:
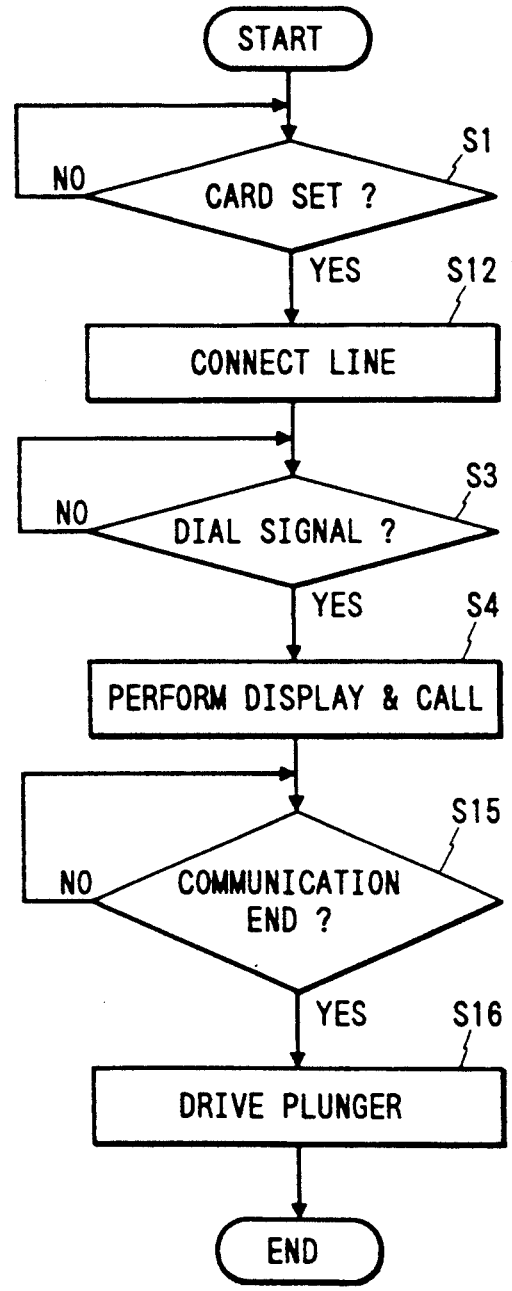
FIG. 6 is a flow chart of the second embodiment.

A call generation operation using the card will be described below with reference to FIG. 6. A card 15 is fitted in the card mounting portion 14 on an operation unit 12. The section of the card mounting portion 14 is as shown in FIG. 5, and the card is held by the engaging portion 23 and the elastic member 22. When the microswitch 20 falls down, a CPU 1 detects that the card is normally fitted (step S1), and connects a line through an NCU 9 (step S12). The CPU 1 then waits for telephone number data from the card 15. An operator searches a destination to be called on a display unit of the card 15 or sets the card with the already searched data, and then depresses a telephone number transfer button 16. A telephone number is then transferred to the facsimile apparatus (step S3), and the CPU 1 calls the transferred number (step S4).

Upon completion of facsimile communication (step S15), the CPU 1 disconnects a line, and controls the plunger 21 to lift the card to a position where the microswitch 20 does not fall down, thereby preventing reconnection of a line (step S16).

When an operator makes a telephone call from a telephone set 11, the microswitch can be controlled in an off-hook state.

As described above, since a switch is arranged on a card mounting portion on a telephone set, and can detect that a card is mounted, a line can be connected without requiring an operator to pick up a handset or depress an on-hook button.

In this embodiment, a telephone number is received from the card as a light signal. The same effect as described above can be provided when a telephone number is received as an electrical signal.

Third Embodiment

In this embodiment, in addition to the arrangement of the first embodiment, light generation and light reception elements are arranged on both a telephone set and a card. When a line is connected, a dial data transfer allowance signal is supplied from the telephone set to the card by means of light. Upon reception of the signal, the card supplies dial information to the telephone set by means of light. Thus, when the line is connected, exchange of dial data is started.

Figure 7:
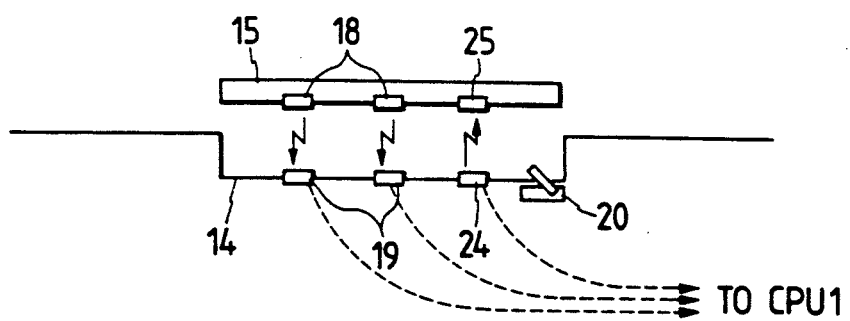
FIG. 7 is a sectional view of a card mounting portion according to the third embodiment of the present invention.

The arrangement of a facsimile apparatus of this embodiment is common to that shown in FIGS. 1 and 3. FIG. 7 is a sectional view of a card mounting portion 14 of this embodiment. The card mounting portion 14 has a light generation element 24 for generating a transfer allowance signal in addition to light reception elements 19 for detecting dial data and a microswitch 20. On the other hand, a card 15 has a light reception element 25 in addition to light generation elements 18 for transmitting dial data. As is well known in the art, a light generation element includes a power source, an LED or other device that produces light and a switch element to turn on and off the LED or other device. An arrangement of a light generation element and a light receiving element corresponding to that shown in FIG. 8 of U.S. Pat. No. 4,126,768 issued Nov. 21, 1978 to R.L. Grenzow may be used as the light generating and light receiving elements shown in the drawings.

Figure 8:
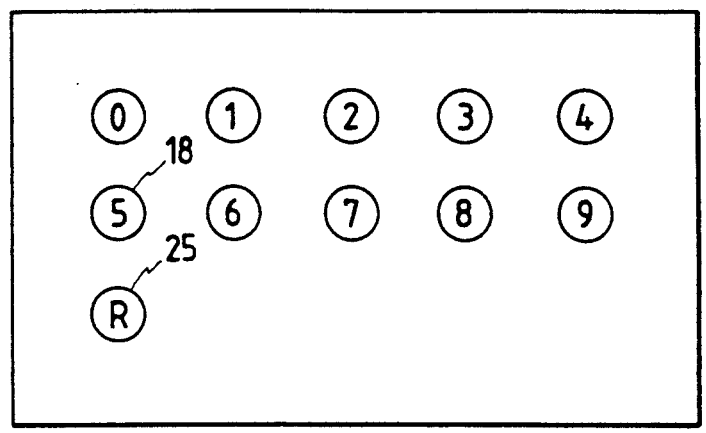
FIG. 8 is a bottom view of a card of the third embodiment.
Figure 9:
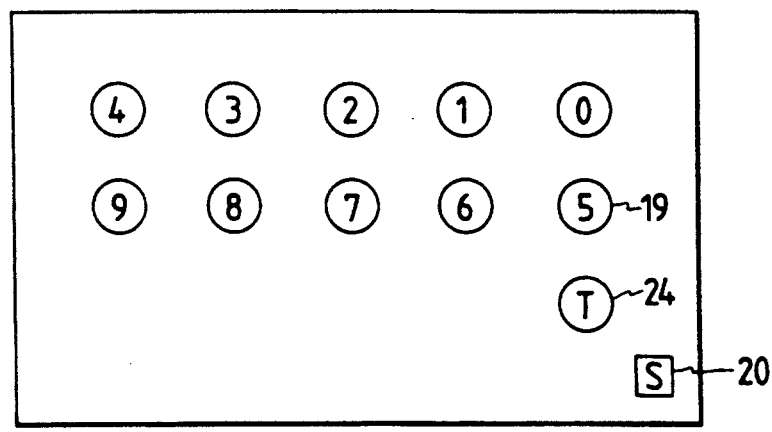
FIG. 9 is a plan view of a card mounting portion of the third embodiment.

FIG. 8 is a bottom view of the card 15, and FIG. 9 is a plan view of the card mounting portion.

Figure 10:
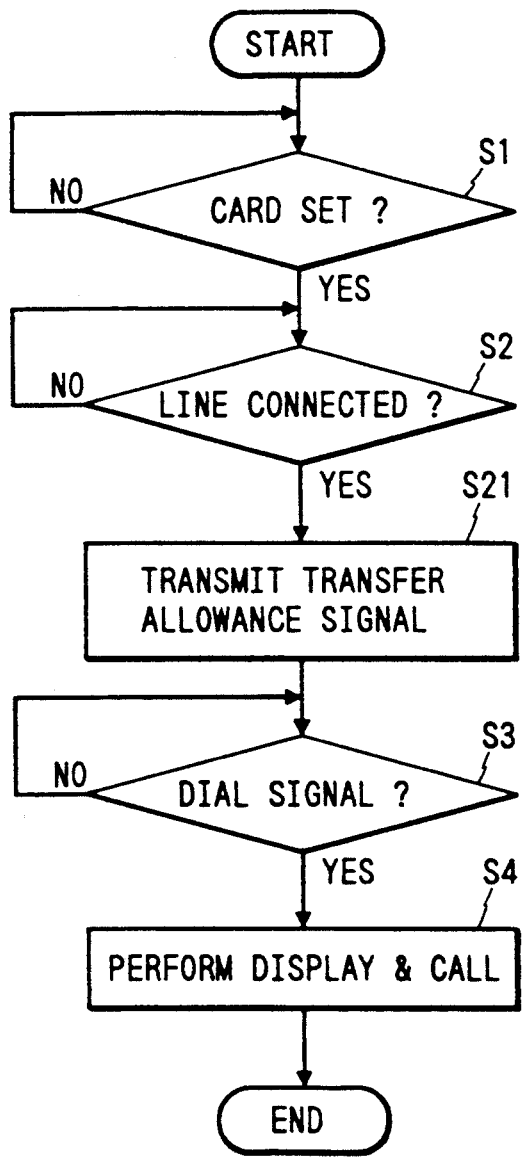
FIG. 10 is a flow chart of the third embodiment.

The operation of this embodiment will be described below with reference to FIG. 10.

Call generation processing using the card is performed as follows. That is, as shown in FIG. 1, the card is mounted on the card mounting portion 14 on the telephone set, and a destination to be called is searched on a display unit. Note that the card may be set on the card mounting portion 14 after the destination is searched in advance. A CPU 1 detects based on the microswitch 20 that the card is set (step S1).

After a destination telephone number is displayed on the display unit of the card, an operator picks up a handset of a telephone set 11 or depresses an on-hook button 17, thereby connecting a line. The CPU 1 checks through an NCU 9 if a line is connected. When the CPU 1 detects line connection while the card 15 is set, it causes the light generation element 24 for generating a transfer allowance signal to emit light (step S21).

The light reception element 25 of the card 15 detects the transfer allowance signal, and the card 15 transfers displayed dial data. The dial data is transferred between the light generation elements 18 of the card 15 corresponding to numerals "0" to "9" and the light reception elements 19 of the telephone set corresponding to numerals "0" to "9".

After the CPU 1 operates the light generation element 24 for generating the transfer allowance signal, it detects whether or not light is incident on the light reception elements 19 (step S3). If the CPU 1 detects the light, it sequentially stores dial data in a RAM 3. Upon reception of the last digit of the telephone number, the CPU 1 executes call generation processing on the basis of the dial data stored in the RAM 3(step S4).

Note that as shown in FIG. 7, the microswitch 20 for detecting whether or not the card is mounted is arranged on the card mounting portion 14. When no card is mounted, a light signal reception operation by the light reception element 19 is stopped, and an erroneous operation caused by external light can be prevented.

Fourth Embodiment

In this embodiment, when a card-like electronic telephone directory is removed, a signal from a light reception element is invalidated.

The arrangement of a facsimile apparatus of this embodiment is common to that shown in FIGS. 1 and 3.

Figure 11:
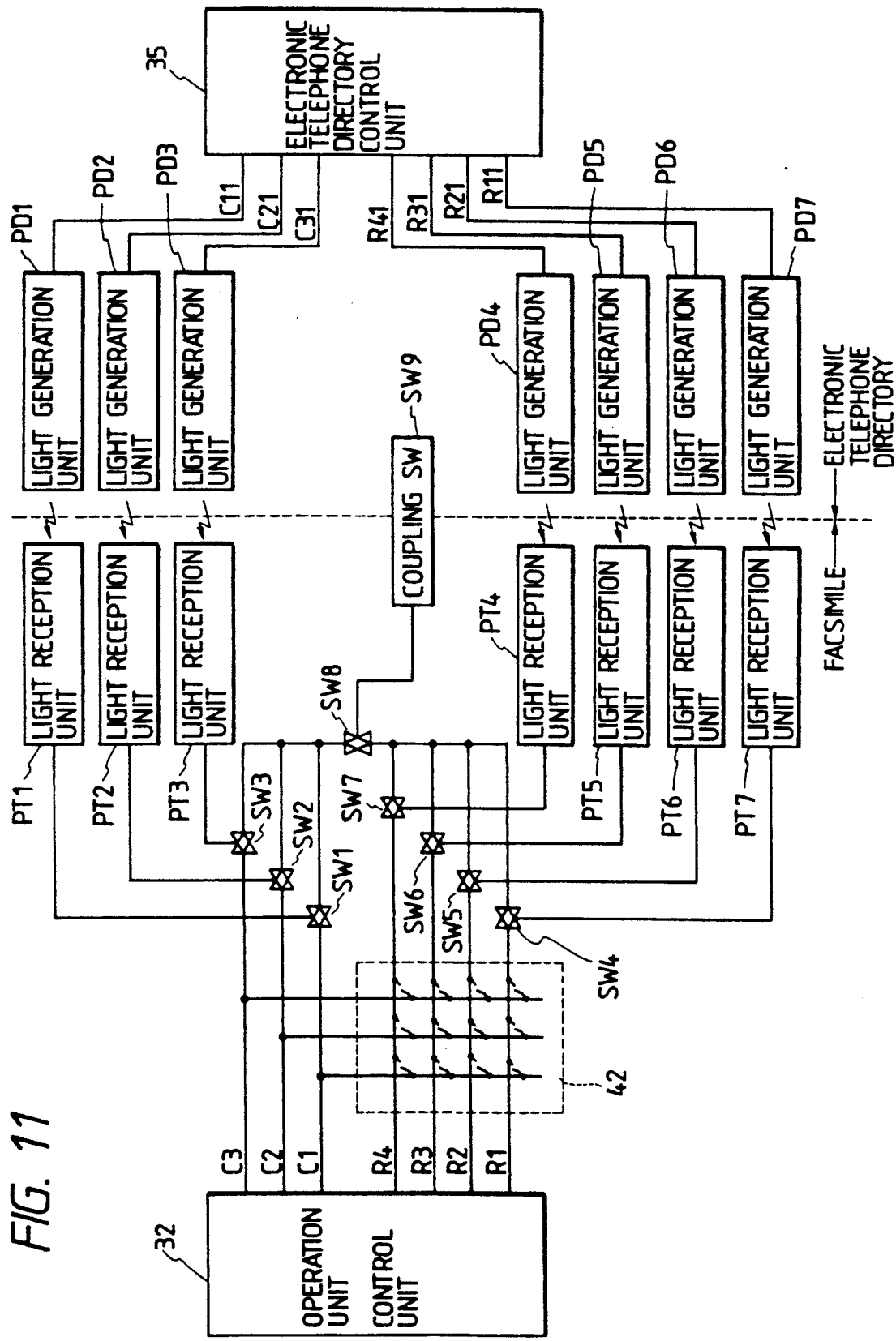
FIG. 11 is a block diagram of an interface unit according to the fourth embodiment of the present invention.

FIG. 11 is a block diagram of an interface portion between an operation unit 12 and an electronic telephone directory 15. An operation unit control unit 32 is a control unit for the operation unit 12 shown in FIG. 3, and monitors depression of keys in a ten-key unit 42. A control unit 35 controls the electronic telephone directory 15.

When the electronic telephone directory control unit 35 generates dial signals in a predetermined pattern through signal lines C11, C21, C31, R11, R21, R31, and R41, light generation units 18 (PD1 to PD7) convert the electrical signals into light signals. Light reception units 19 (PT1 to PT7) of the facsimile apparatus convert the light signals into electrical signals. Switches SW1 to SW7 convert the electrical signals into ten-key depression signals, and send them to the operation unit control unit 32. By way of example with reference to FIG. 11, optical signals from light generation units PD3 and PD4 may activate switches SW3 and SW7 to connect terminals C3 and R4 of the operation control unit 32. The same connection state is obtained by depressing the upper right hand key of ten-key unit 42. Accordingly, various combinations of the seven light generation unit supply the ten key depression states of ten-key unit 42.

A coupling switch SW9 monitors whether or not the electronic telephone directory 15 is mounted on the operation unit 12, and comprises a microswitch or a reflection type photosensor. When the electronic telephone directory 15 is mounted, the switch SW9 enables a switch SW8. In this case, the switches SW1 to SW7 are enabled, and supply ten-key depression signals to the operation unit control unit 32. On the other hand, when the electronic telephone directory is removed, the coupling switch SW9 disables the switch SW8. In this case, no ten-key depression signals are input to the operation unit control unit 32 regardless of the enabled/disabled states of the switches SW1 to SW7. Even if the electronic telephone directory 15 is removed while telephone number data is transmitted from the electronic telephone directory 15, the light reception units (PT1 to PT7) can be prevented from being erroneously operated, and wrong ten-key depression signals (dial signals) are prevented from being input to the operation unit control unit 32.

Fifth Embodiment

In this embodiment, when a card-like electronic telephone directory is removed, a caught line is released. The arrangement of a facsimile apparatus of this embodiment is common to that shown in FIGS. 1 and 3.

Figure 12:
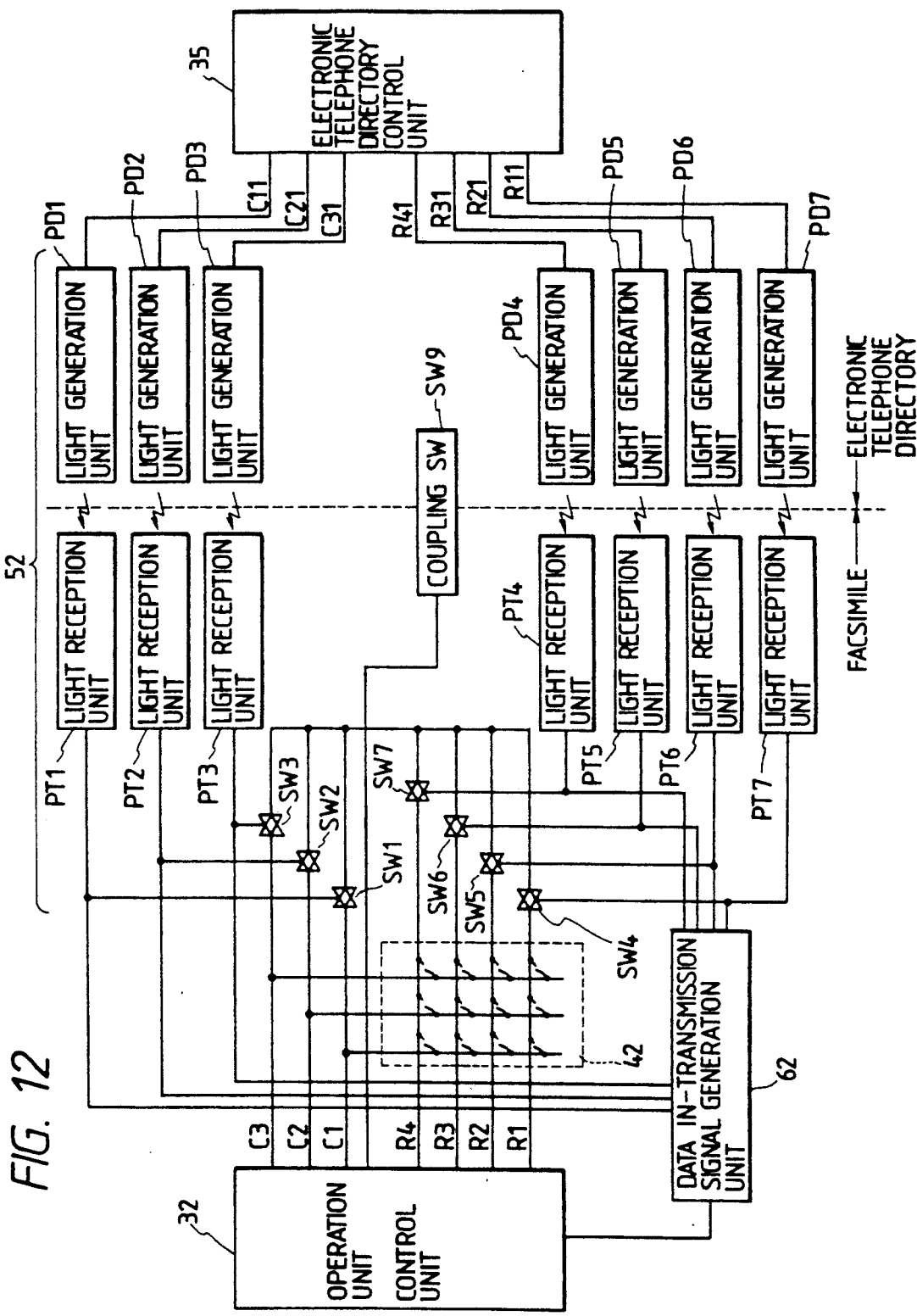
FIG. 12 is a block diagram of an interface unit according to the fifth embodiment of the present invention.

FIG. 12 is a block diagram of an interface portion between an operation unit 12 and an electronic telephone directory 15 of this embodiment. The same reference numerals in FIG. 12 denote the same parts as in FIG. 11, and a detailed description thereof will be omitted. A data in-transmission signal generation unit 62 generates a signal indicating that dial number data is being received from the electronic telephone directory 15. When the next dial data is not received within a predetermined period of time after one dial data is received from one of the light reception units PT1 to PT7, the data in-transmission signal generation unit 62 determines that transfer of dial data is completed. The generation unit 62 generates an in-transmission signal from when transfer of dial data is started and until it is completed.

Figure 13:
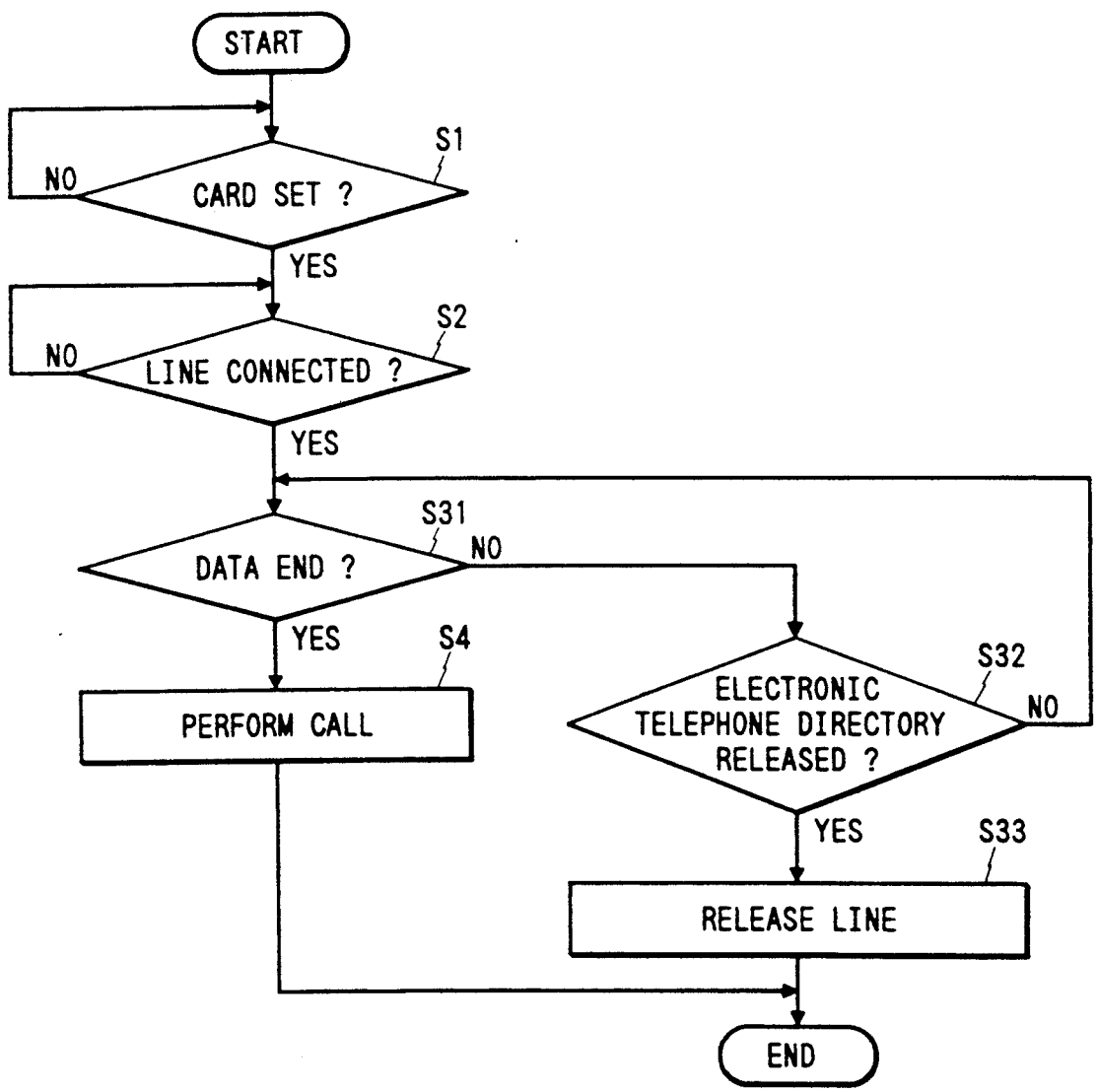
FIG. 13 is a flow chart of the fifth embodiment.

The operation of this embodiment will be described below with reference to FIG. 13.

In this embodiment, a control unit 32 supplies a state of a coupling switch SW9 to a CPU 1. The CPU 1 controls an NCU 9 according to an instruction from an operator, thereby catching a telephone line 10 (step S2). The CPU 1 then causes the light reception units (PT1 to PT7) to receive dial data from the electronic telephone directory 15. When the CPU 1 detects based on the signal from the switch SW9 that the electronic telephone directory 15 is removed while it determines based on the signal from the data in-transmission signal generation unit 62 that dial data from the electronic telephone directory 15 is being received (steps S31 and S32), it sends a signal to the NCU 9, thereby releasing the caught line (step S33). If a line is not caught, no processing is executed.

On the other hand, upon completion of reception of the dial data, the CPU 1 performs call generation processing.

According to this embodiment, when the electronic telephone directory 15 is removed during reception of dial data, no call generation processing is performed. Furthermore, if no call generation processing is performed after a line is caught, a howler tone is input. Thus, in this embodiment, when the electronic telephone directory is removed, no call generation processing is performed, and the caught line is released.

Even when the electronic telephone directory 15 is removed after reception of dial data is completed, the line is not released. Therefore, communication will not be interrupted even if the electronic telephone directory 15 is removed after it becomes unnecessary.

This embodiment exemplifies a case wherein the electronic telephone directory is removed while dial data is being received as light signals. When dial data are received as electrical signals, the same effect as described above can be obtained.

Sixth Embodiment

In this embodiment, when an electronic telephone directory is removed during reception of dial data from the electronic telephone directory, a buffer in a main body is cleared.

The arrangement of a facsimile apparatus of this embodiment is common to that shown in FIGS. 1 and 3.

Figure 14:
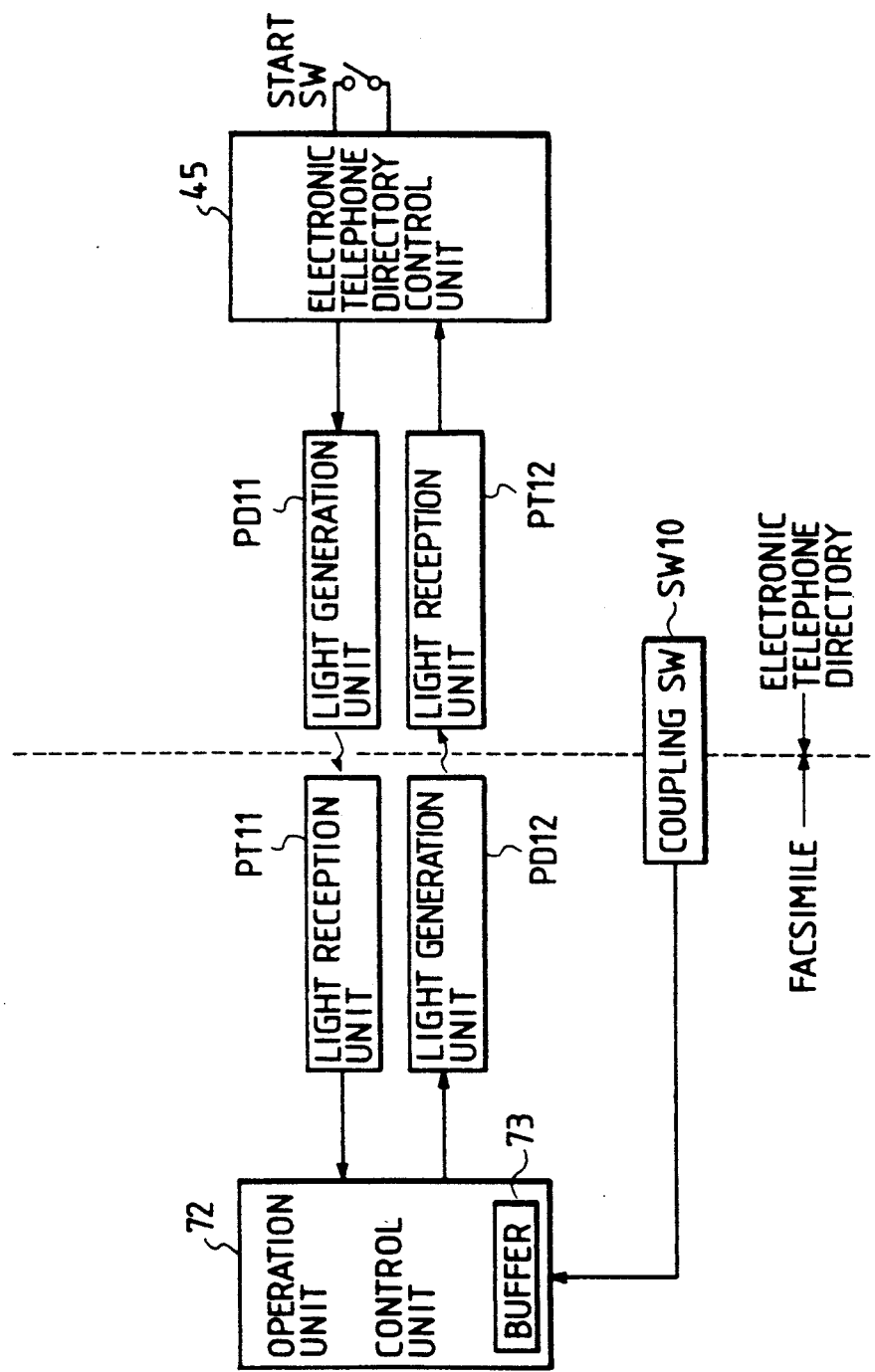
FIG. 14 is a block diagram of an interface unit according to the sixth embodiment of the present invention.

FIG. 14 shows an interface portion between an operation unit 12 and an electronic telephone directory 15 of this embodiment.

Figure 16:
FIG. 16 shows a signal format of the sixth embodiment.

An electronic telephone directory control unit 45 serially outputs a start signal, a dial signal, and an end signal upon depression of a start switch by a user. The dial signal from the electronic telephone directory control unit 45 is converted from an electrical into a light signal by a light generation unit PD11. A light reception unit PT11 is arranged in the facsimile apparatus, and photoelectrically converts the input signal. The unit PT11 supplies the converted signal to an operation unit control unit 72. A control signal from the operation unit control unit 72 is supplied to the electronic telephone directory control unit 45 via a light generation unit PD2 and a light reception unit PT2. A switch SW10 monitors whether or not the electronic telephone directory 15 is removed from the facsimile main body, and comprises a microswitch or a reflection type photosensor. Information from the switch SW10 is supplied to the operation unit control unit 72. A format of a signal sent from the electronic telephone directory control unit 45 to the operation unit control unit 72 is as shown in FIG. 16.

Figure 15:
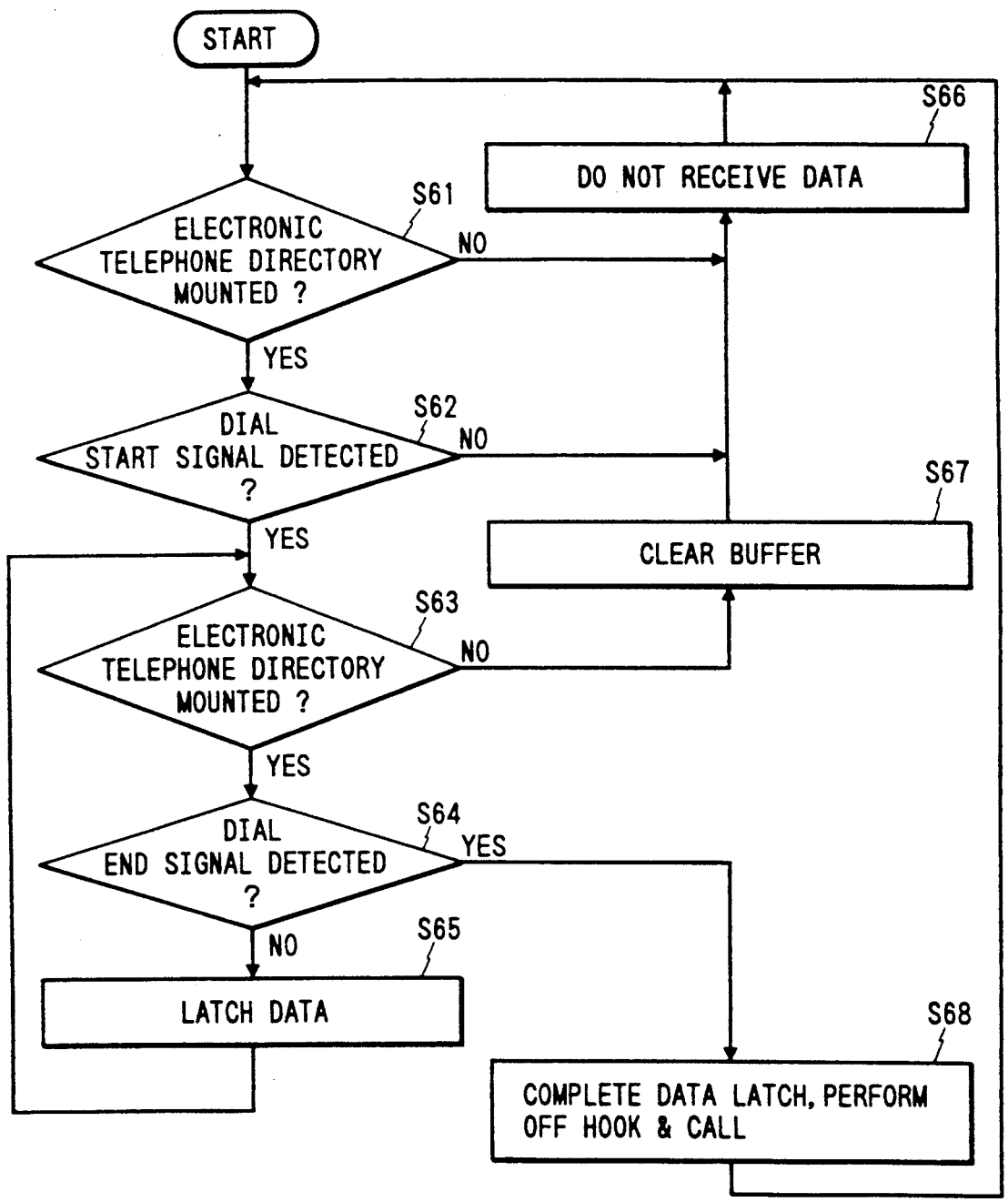
FIG. 15 is a flow chart of the sixth embodiment.

FIG. 15 is a flow chart showing an operation of the operation unit control unit 72.

In step S61, the operation unit control unit 72 checks based on the switch SW10 if the electronic telephone directory 15 is mounted. If NO in step S61, no data is received in step S66. If YES in step S61, it is checked in step S62 if a dial start signal is detected. If NO in step S62, the flow returns to step S61 via step S66. If the start signal is detected in step S62, a CPU 1 checks in step S63 if the electronic telephone directory 15 is mounted. If YES in step S63, it is checked in step S64 if an end signal is detected. If NO in step S64, the CPU 1 latches data in a buffer 73 in step S65, and the flow returns to step S63.

If it is determined in step S63 that the electronic telephone directory 15 is removed, the content of the buffer 73 which stores dial information after the start signal is cleared in step S67. If the end signal is detected in step S64, a data latch operation is completed, an off-hook state is set, and call generation processing is then executed in step S68. Thereafter, the flow returns to step S61.

As described above, since data-transferred dial information stored in the buffer is cleared upon detection of removal of the electronic telephone directory 15 from the facsimile main body, an erroneous dialing operation caused by external light can be reliably prevented.

Seventh Embodiment

In this embodiment, when an electronic telephone directory 15 is removed, a signal from the electronic telephone directory 15 is inhibited from being received in order to prevent an erroneous operation caused by external light. When it is detected that the electronic telephone directory 15 is mounted, the signal from the electronic telephone directory 15 is received after a small delay time, thus satisfactorily eliminating the influence of external light.

Figure 17:
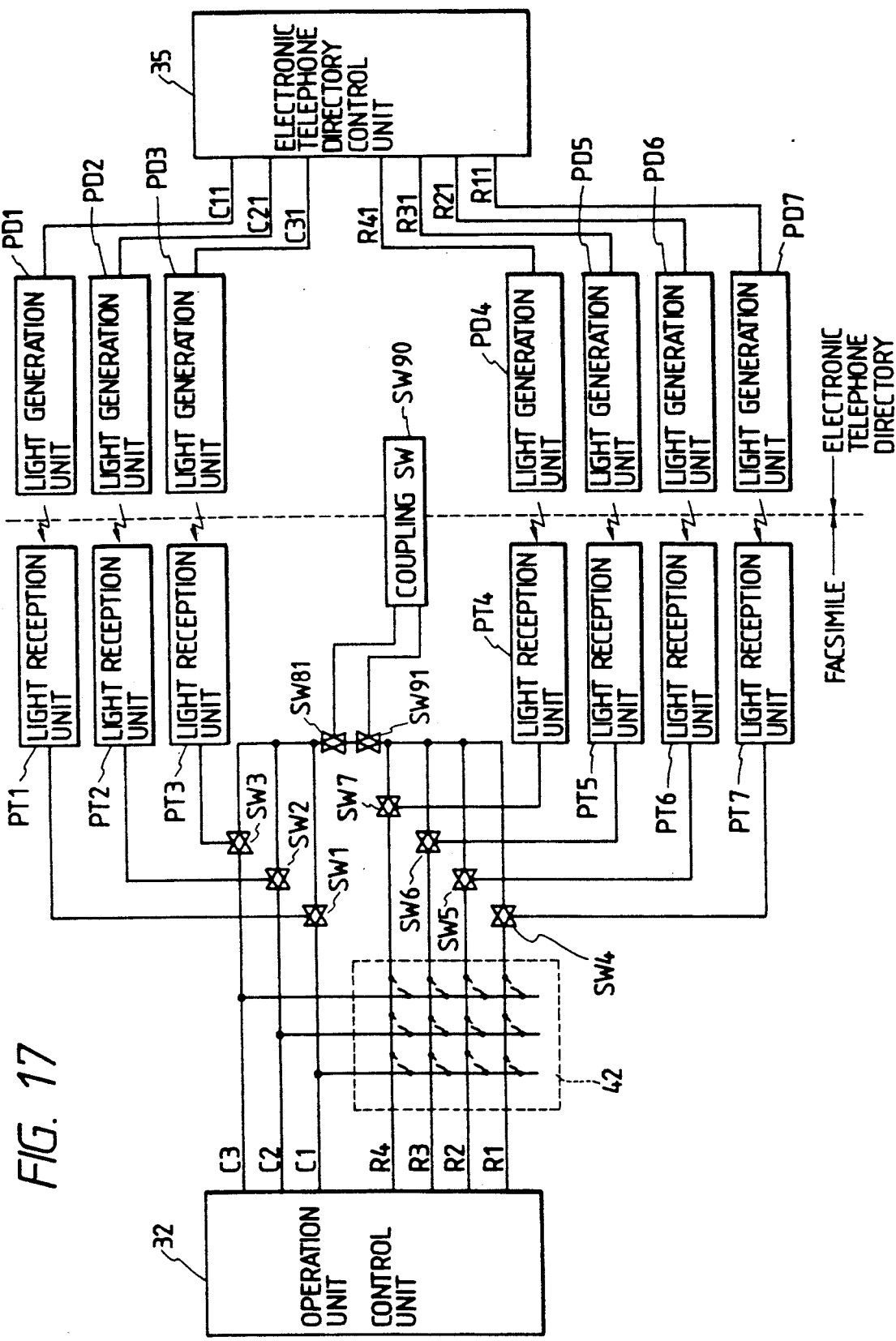
FIG. 17 is a block diagram of an interface unit according to the seventh embodiment of the present invention.

The arrangement of a facsimile apparatus of this embodiment is common to that of FIGS. 1 and 3. FIG. 17 shows an interface portion between an operation unit 12 and electronic telephone directory 15 of this embodiment. The same reference numerals in FIG. 17 denote the same parts as in FIG. 11, and a detailed description thereof will be omitted. A coupling monitor switch SW90 monitors whether or not the electronic telephone directory is mounted. When the electronic telephone directory is mounted, the switch SW90 enables switches SW81 and SW91. Therefore, switches SW1 to SW7 are enabled, and supply ten-key depression signals from the electronic telephone directory 15 to an operation unit control unit 32. On the other hand, when the electronic telephone directory 15 is removed, the switch SW90 disables the switches SW81 and SW91. Therefore, no ten-key depression signals from the electronic telephone directory are input to the operation unit control unit 32 at all regardless of the enabled/disabled states of the switches SW1 to SW7. When the electronic telephone directory is removed, light reception units (PT1 to PT7) can be prevented from being erroneously operated due to external light to input wrong ten-key depression signals (dial signals) to the operation unit control unit 32.

Figure 18:
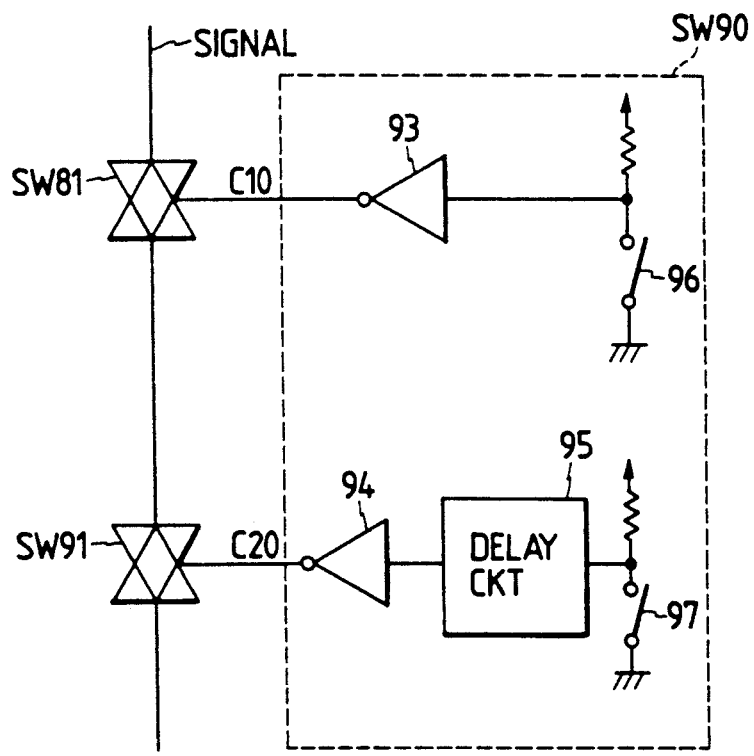
FIG. 18 is a block diagram of a switch SW 90 of the seventh embodiment.

FIG. 18 is a detailed block diagram of a circuit portion of the switches SW90, SW81, and SW91. The monitor switch SW90 comprises switches 96 and 97 for detecting whether or not the electronic telephone directory 15 is mounted on the facsimile apparatus. When the electronic telephone directory 15 is mounted, these switches are closed. In this case, inputs to buffers 93 and 94 go to low level, and their outputs are inverted and go to high level. A delay circuit 95 comprises a capacitor, and the like, and the output from the buffer 94 is delayed from that of the buffer 93. The analog switches SW81 and SW91 receive control signals C10 and C20. The analog switches SW81 and SW91 are turned on when the corresponding control signals are at high level. More specifically, when the electronic telephone directory 15 is mounted, the analog switches SW81 and SW91 are turned on.

Figure 19:
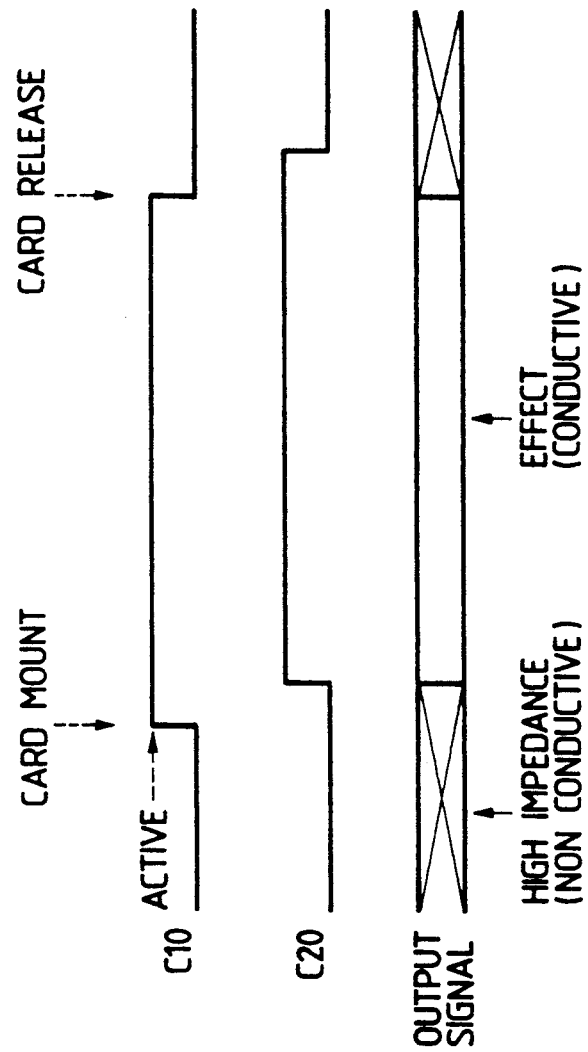
FIG. 19 is a timing chart of the seventh embodiment.

FIG. 19 is a timing chart, and illustrates the control signals C10 and C20 of the analog switches SW81 and SW91. An output signal illustrated below these control signals indicates a conductive/non-conductive state across the two ends of the analog switches SW81 and SW91. As shown in the timing chart, when the electronic telephone directory 15 is mounted, the switch SW91 is turned on after a given delay time, and the output signal is set in the conductive state, thus setting a signal reception state from the electronic telephone directory. When the electronic telephone directory is removed, the switch SW81 is turned off, and the output signal is immediately set in the non-conductive state, thus inhibiting reception of signals from the electronic telephone directory.

When the electronic telephone directory is mounted, and the switch SW90 is turned on, light cannot often be perfectly shielded and external light may leak. According to this embodiment, since no dial signal is detected before the lapse of a predetermined delay time even if the switch SW90 is turned on, an erroneous operation caused by external light can be prevented.

Figure 20:
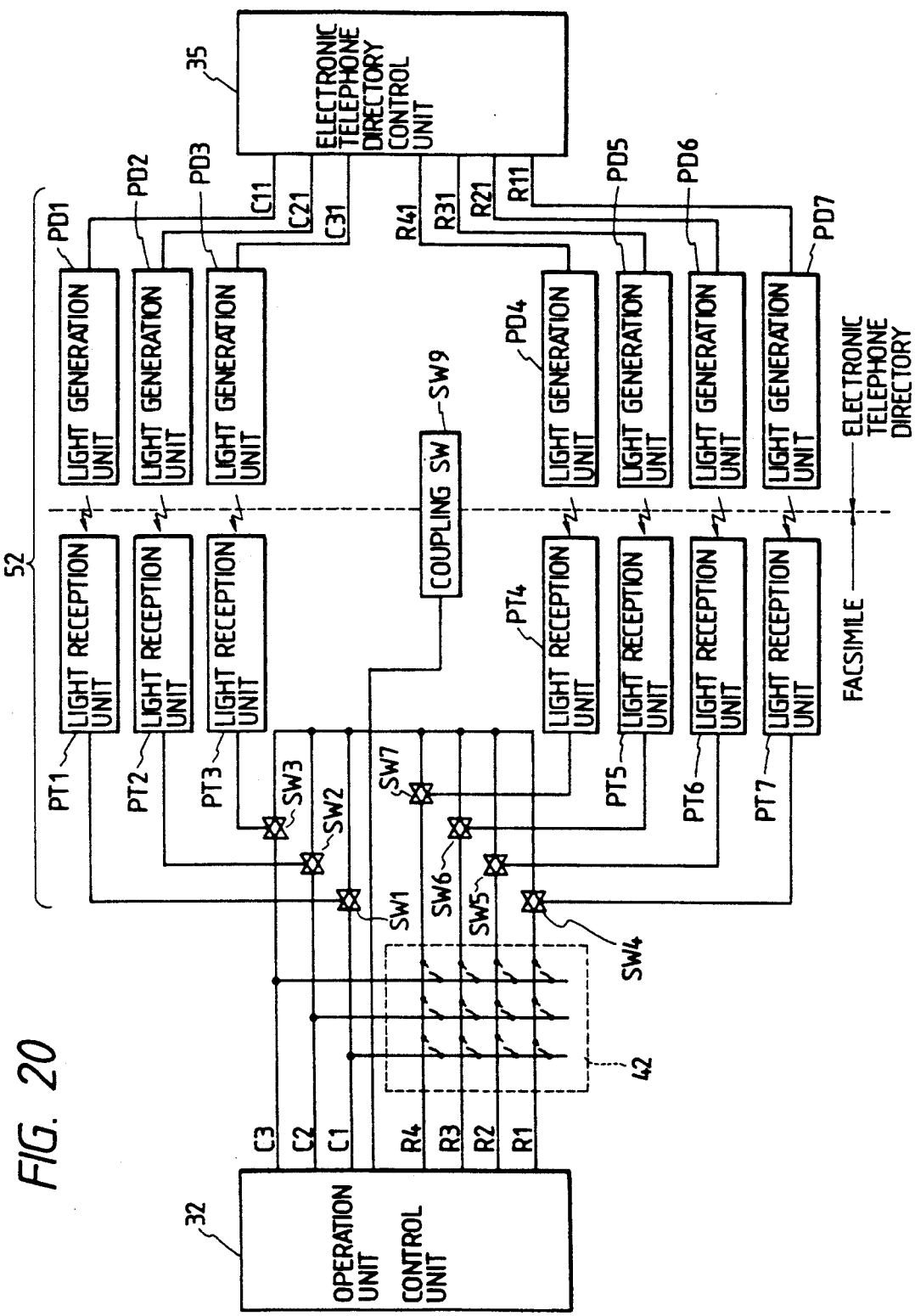
FIG. 20 is a block diagram of another interface unit that may be used in the seventh embodiment.

FIG. 20 is a block diagram when the operation shown in FIG. 17 is performed in a software manner.

Figure 21:
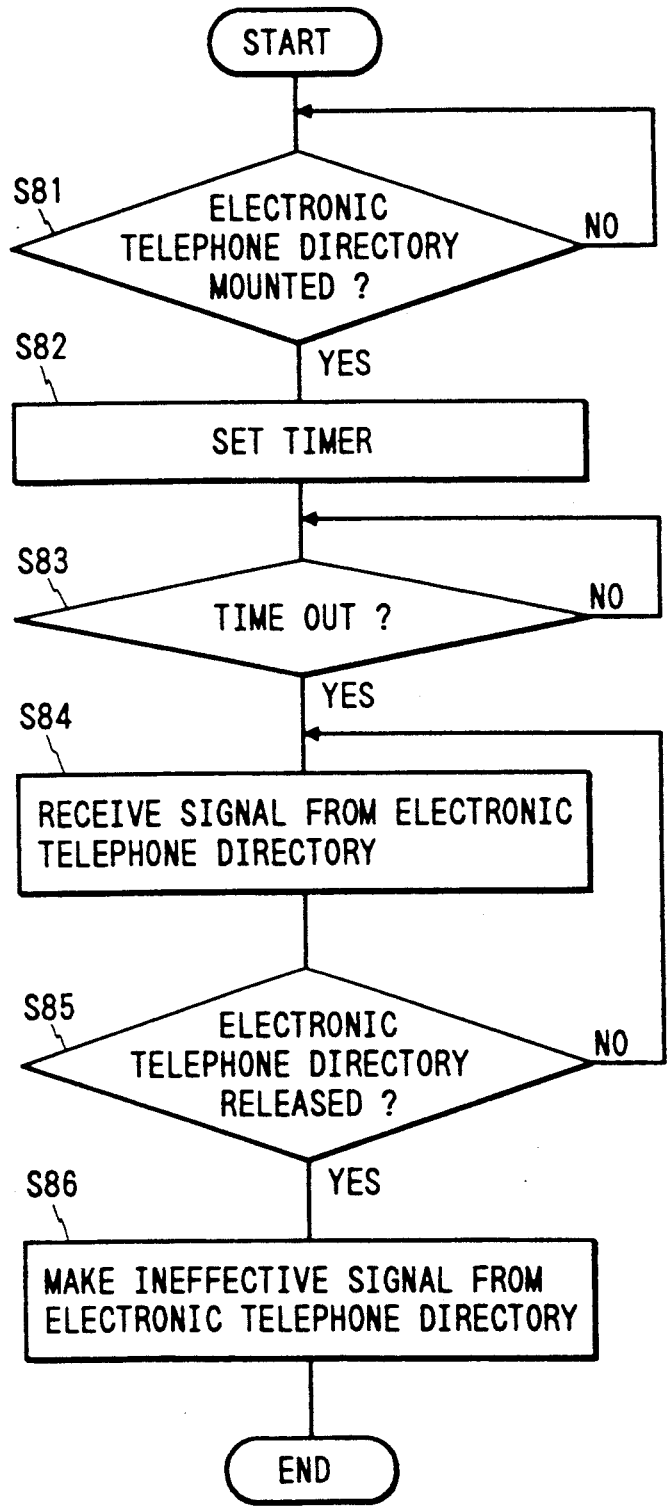
FIG. 21 is a flow chart of the seventh embodiment.

FIG. 21 is a flow chart showing an operation of the operation unit control unit 32. In step S81, the operation unit control unit 32 monitors whether or not the electronic telephone directory 15 is mounted. If YES in step S81, the unit 32 sets a timer in step S82, and monitors in step S83 if the timer is time-out. More specifically, in steps S82 and S83, a light signal detection start timing is delayed Thereafter, reception of a signal from the electronic telephone directory 15 is started in step S84.

When the electronic telephone directory is released, it is checked in step S85 if the directory is released. If YES in step S85, a signal from the electronic telephone directory is made ineffective in step S86.

Eighth Embodiment

A telephone set 100 of this embodiment catches a line and transmits a dial signal upon reception of a light signal from a card dialer 200. When the card dialer 200 is disengaged during reception of a dial signal from the card dialer 200, the telephone set releases the caught line.

FIG. 22 shows the arrangement of this embodiment. The telephone set 100 includes a CPU 101 as a control unit of the telephone set 100, a light reception unit 102, comprising, e.g., a photodiode, for receiving a light signal from the card dialer, and a microswitch 103 for detecting whether or not the card dialer 200 is set on the telephone set 100. The microswitch 103 may be replaced with a reflection type photosensor. The telephone set 100 also includes a dial circuit 104 for outputting a dial tone onto a line 107, a ROM 105 for storing a table for converting a light signal received by the light reception unit 102 into a dial pulse or tone, a hook switch 106 for catching or releasing a line, the telephone line 107, and a RAM 108.

The card dialer 200 is in tight contact with the light reception unit 102 so that no external line is incident on the light reception unit 102 of the telephone set 100, and supplies a line catch instruction and a dial signal as light signals to the light reception unit 102. The card dialer 200 includes a CPU 201 as a control unit of the card dialer 200, a light generation unit 202 such as a light-emitting diode, a display unit 203 comprising, e.g., a liquid crystal display, an operation unit 204, a ROM 205, and a RAM 206. An operator operates a ten-key pad and alphabet keys on the operation unit 204 to register a telephone number and a name in the RAM 206. When the operator wants to make a telephone call, he or she operates a search key on the operation unit to search a telephone number to be called from those registered in the RAM 206 in advance while observing the display unit 203.

Figure 23:
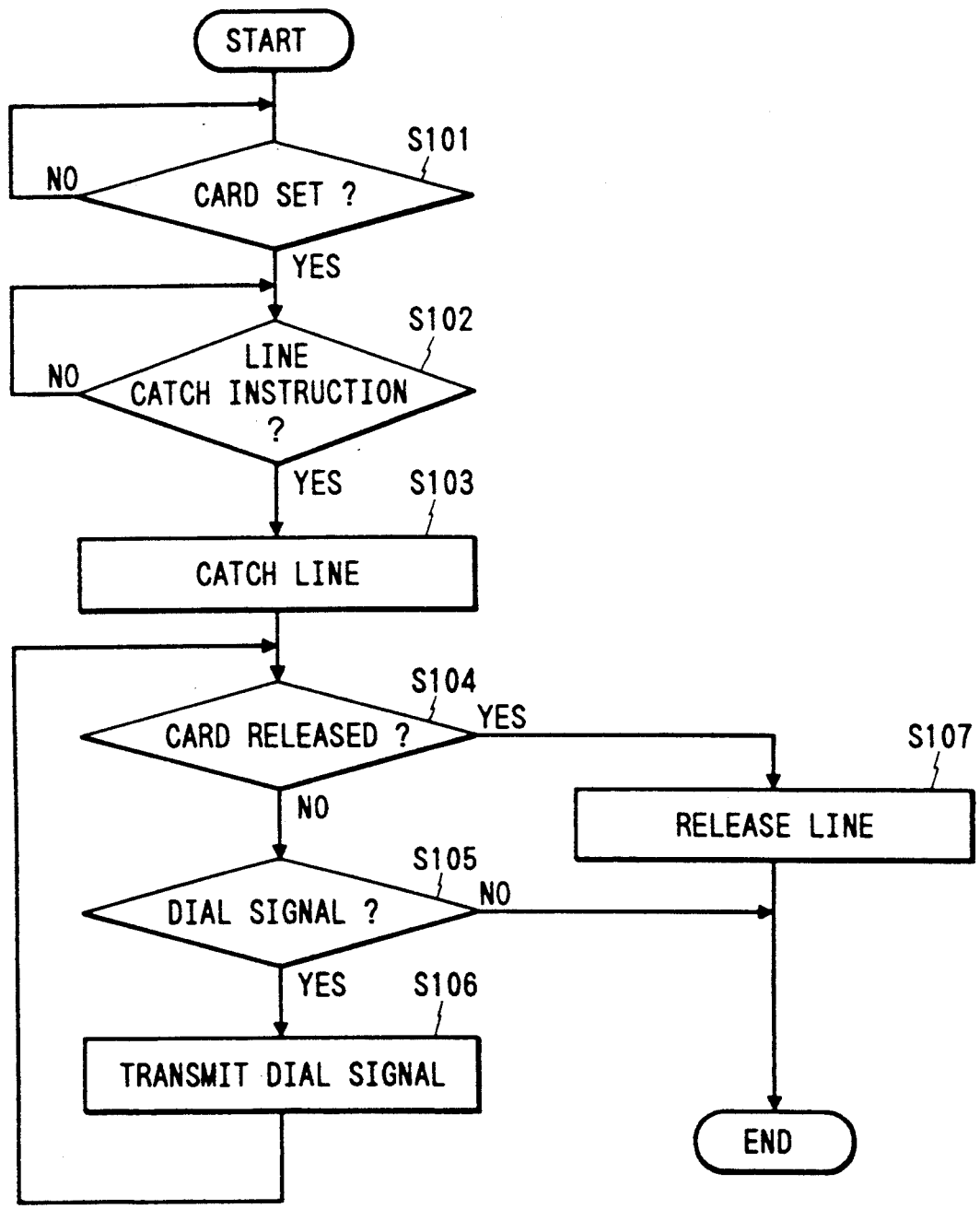
FIG. 23 is a flow chart of the eighth embodiment.

The operation of this embodiment will be described below with reference to FIG. 23. The CPU 101 of the telephone set 100 detects based on the microswitch 103 that the operator sets the card dialer 200 on the telephone set (step S101). When the operator depresses a call button of the operation unit 204, the CPU 201 controls the light generation unit 202 to transmit a line catch instruction as a light signal to the light reception unit 102. When the CPU 101 receives the line catch instruction at the light reception unit 102 (step S102), it controls the hook switch 106 to catch the line (step S103). The CPU 201 transmits a dial signal after the lapse of a time required for the telephone set to catch a line after the line catch instruction is transmitted. More specifically, the CPU 201 encodes the dial number displayed on the display unit 203 while looking up the ROM 205, and sequentially drives the light generation unit to emit light.

After the line is caught in step S103, the CPU 101 checks based on the microswitch 103 if the card dialer 200 is released (step S104) and checks based on the light reception unit 102 if a dial signal is input as a light signal (step S105). If the dial signal is detected (step S105), the CPU 101 converts the light signal into a dial pulse while looking up the ROM 105. Then, the CPU 101 drives the dial circuit 104 to transmit the dial pulse onto the line 107. For example, when a dial number "123-4567" is to be called, 1, 2, 3, 4, 5, 6, and 7 are encoded, and are input at predetermined intervals. When the next light signal cannot be detected within a predetermined period of time, the CPU 101 determines that all the dial signals are received (step S105), and ends light detection by the light reception unit 102.

When the CPU 101 detects based on the microswitch 103 that the card dialer 200 is released before all the dial signals are received (step S104), it controls the hook switch to release the line (step S107). Thereafter, no light detection is performed.

After the CPU 101 determines that all the dial signals are received, it does not release a line even if the card dialer 200 is released.

In this manner, when the card dialer 200 is released during reception of dial signals, light detection is interrupted, and a line is released, thus preventing an erroneous operation caused by external light. Furthermore, a howler tone which is sent when a line is kept caught after no call generation processing is performed can also be prevented.

Whether or not the card dialer is released may be detected by discriminating whether or not a signal other than a dial signal and a line catch instruction is input from the light reception unit 102 without using the microswitch.

This embodiment exemplifies a case wherein the card dialer is released when the dial signal is received as a light signal. The same applies to a case wherein a dial signal is received as an electrical signal.

Ninth Embodiment

Upon reception of a dial signal from a card dialer as a light signal, a telephone set of this embodiment decodes and stores the light signal, and then catches a line to generate a call. When the card dialer is released before completion of reception of a dial signal, the telephone set of this embodiment does not catch the line.

Figure 24:
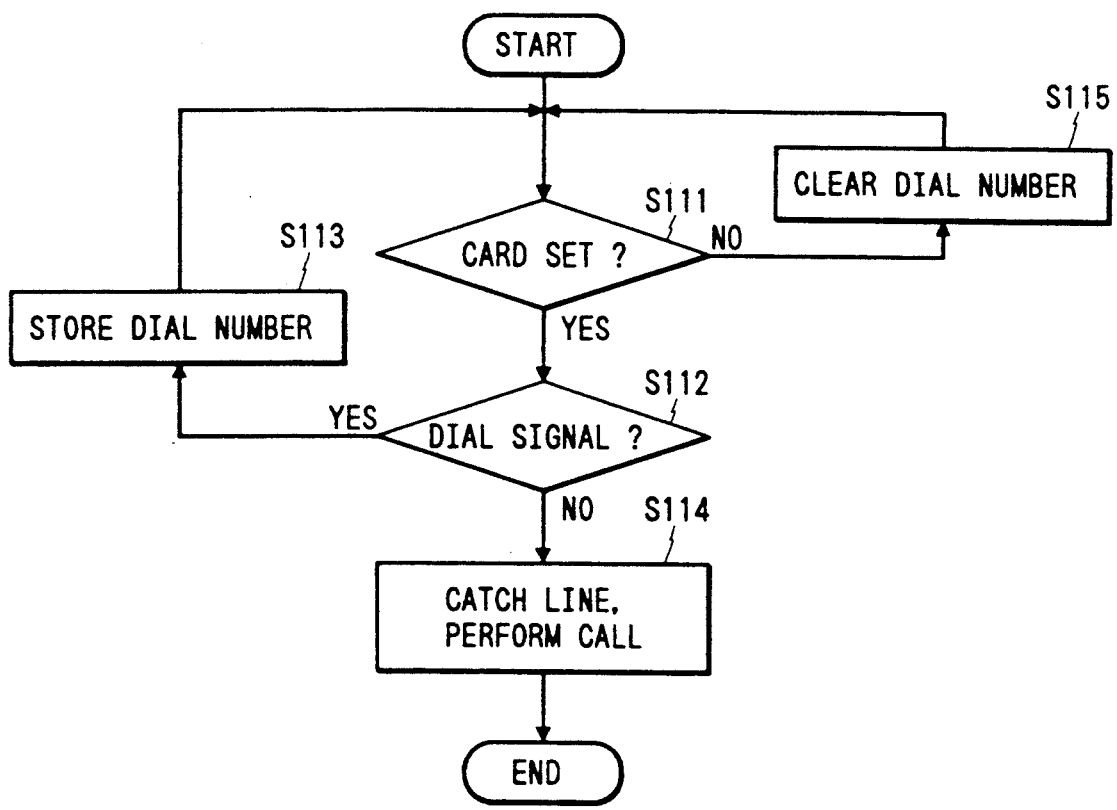
FIG. 24 is a flow chart of the ninth embodiment.

The arrangement of this embodiment is common to that shown in FIG. 22. FIG. 24 shows an operation of this embodiment.

When a CPU 101 detects based on a microswitch 103 that a card dialer 200 is set (step S111), it detects a dial number sent as a light signal from a light reception unit 102 (step S112). The CPU 101 stores the detected dial number in a RAM 108 (step S113). When the CPU 101 determines that reception of the dial signal is completed (step S112), it controls a hook switch 106 to catch a line 107, and drives a dial circuit 104 according to the dial number stored in the RAM 108, thereby transmitting dial pulses onto a line 107 (step S114).

When the CPU 101 detects based on the microswitch 103 that the card dialer 200 is released before completion of reception of the dial signal (step S115), it clears the dial number stored in the RAM 108 (step S115). Thereafter, the CPU 101 does not detect a dial number using the light reception unit 102 and does not catch a line. Therefore, an erroneous operation caused by external light can be prevented. When the card dialer is released, since a line is not caught, a howler tone will not be input even if an operator does not respond to release of the card dialer.

As described above, according to this embodiment, a call can be accurately generated, and an erroneous operation can be prevented even when the card dialer is released.

The same applies to a case wherein a dial number is received not as a light signal but as an electrical signal.

Tenth Embodiment

In a facsimile apparatus of this embodiment, of a plurality of light reception units, the number of photocouplers which can be turned on or off is predetermined, and when photocouplers exceeding this number are turned on or off, input information is determined as an error. The arrangement of the facsimile apparatus of this embodiment is common to FIG. 3. An electronic telephone directory 15 is formed into a relatively thick card-like shape, and a liquid crystal display unit for displaying a destination name and its telephone number, and various touch keys for switching a display on the display unit or inputting data are arranged on the surface of the directory. When an operator mounts the electronic telephone directory 15 on an electronic telephone directory mounting portion formed in an operation unit 12 and depresses a transfer button of the electronic telephone directory 15, telephone number information displayed on the liquid crystal display is transferred to the operation unit 12.

The electronic telephone directory mounting portion has a rectangular recessed shape in correspondence with the planar shape of the electronic telephone directory 15, and mounts the electronic telephone directory 15 to carry it. Therefore, as compared to a case wherein information is transferred while a card is inserted in a slot like a conventional IC card, attachment/detachment of the electronic telephone directory 15 is facilitated. Thus, while the electronic telephone directory 15 is mounted on the electronic telephone directory mounting portion, an operator can operate the transfer button or other keys while observing the display unit arranged on the surface of the electronic telephone directory 15.

A plurality of light generation elements are arranged on the lower surface of the electronic telephone directory 15 mounted on the electronic telephone directory mounting portion in this state. Light reception elements corresponding to the light generation elements are arranged on the mounting surface of the electronic telephone directory mounting portion. More specifically, in this embodiment, a signal is transferred in a non-contact manner using photocouplers as a combination of these light generation elements and light reception elements.

Figure 25:
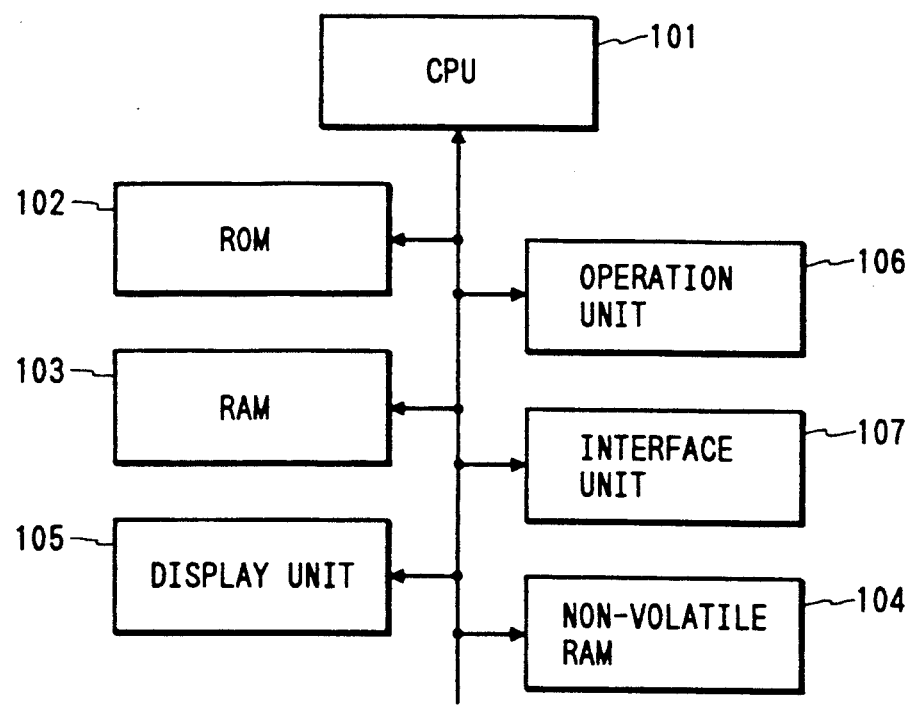
FIG. 25 is a block diagram of an electronic telephone directory of the tenth embodiment.

FIG. 25 is a block diagram showing a circuit arrangement of the electronic telephone directory 15.

A CPU 101 comprises, e.g., a microprocessor, and controls the overall electronic telephone directory 15 according to a control program stored in a ROM 102. The ROM 102 also stores character codes, and the like.

A RAM 103 is utilized as a work area and the like of this system.

In addition, a non-volatile RAM 104 is arranged. The non-volatile RAM 104 stores destination names and telephone number information.

Furthermore, the electronic telephone directory 15 comprises a display unit 105, comprising, e.g., a liquid crystal display, for displaying a destination name, telephone number information, and the like, an operation unit 106 for, e.g., switching a display of the display unit 105, and registering a telephone number, and an interface unit 107 for transferring information to an operation unit 12 of a facsimile apparatus using the above-mentioned photocouplers.

The arrangement of an interface portion between the electronic telephone directory 15 and the operation unit 12 of the facsimile apparatus is common to that shown in FIG. 11.

The electronic telephone directory 15 has eight light generation units PD1 to PD7 comprising photodiodes, and the electronic telephone directory mounting portion of the operation unit 12 comprises eight light reception units PT1 to PT8 comprising phototransistors.

The interface unit 107 of the electronic telephone directory 15 selectively outputs output signals C11 to C31 and R11 to R41 to the light generation units PD1 to PD7, thereby controlling switches SW1 to SW7 via the light generation units PD1 to PD7 and the light generation units PT1 to PT7. Thus, the switches SW1 to SW7 decode the output signals C11 to C31 and R11 to R41, and convert them into signals similar to key depression signals on a ten-key unit 42 of the operation unit 12. These signals are input to a control unit 32 in the operation unit 12.

The normal ten-key unit 42 selectively connects signal lines of the time-divisional signals C11 to C31 and signal lines of the key depression signals R11 to R41 using matrix key switches, so that the control unit 32 time-divisionally monitors inputs of the key depression signals, thereby determining depressed keys. In place of the matrix key switches, the switches SW1 to SW7 selectively connect the signal lines, thereby performing dial inputs like in normal ten-key inputs.

Figure 26:
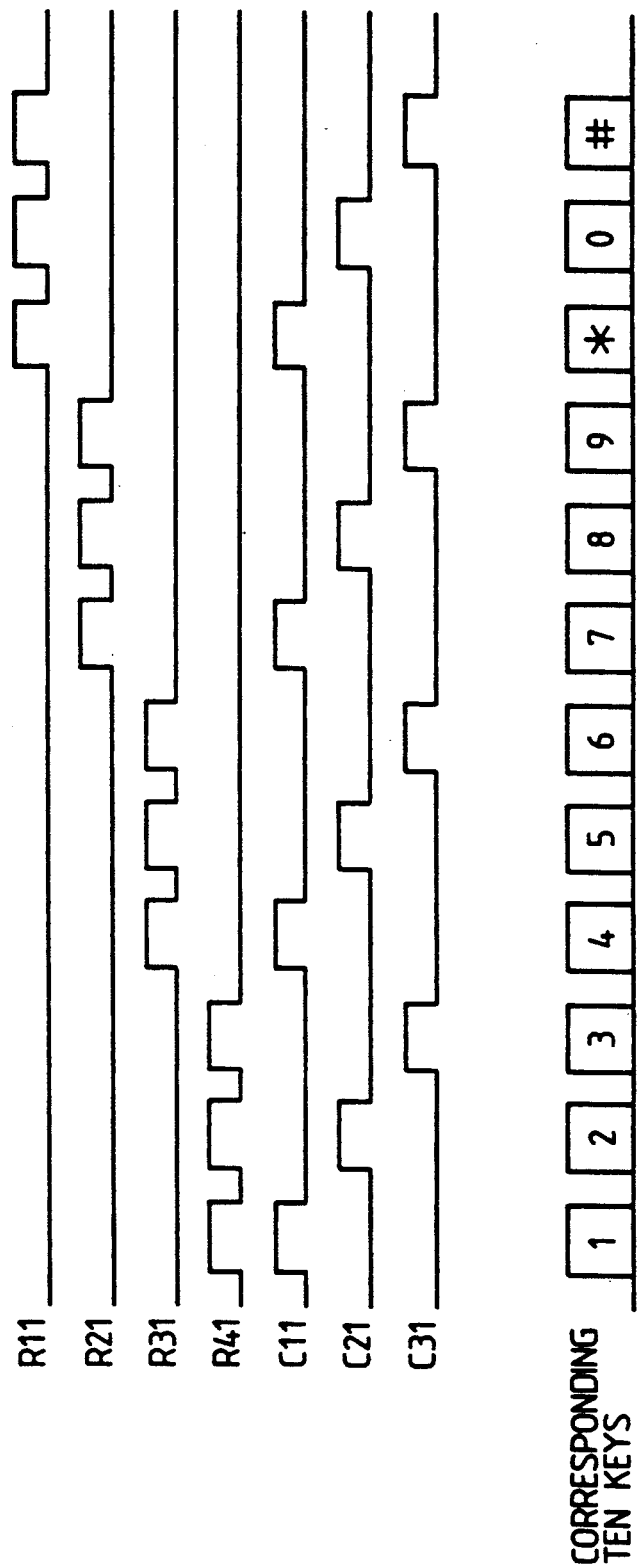
FIG. 26 is a chart showing a correspondence between ten-key inputs and an output of the electronic telephone directory of the tenth embodiment.

FIG. 26 is a chart showing a correspondence between output signals of the electronic telephone directory 15 and ten-key inputs of the operation unit 12.

As shown in FIG. 26, in this embodiment, two of the light generation units PD1 to PD7 are turned on in response to any ten-key inputs.

Figure 27:
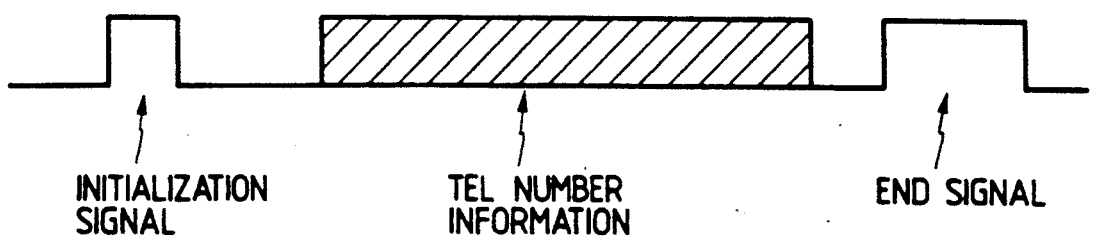
FIG. 27 shows a signal format of the tenth embodiment.

A photocoupler constituted by the light generation unit PD8 and the light reception unit PT8 transfers an initialization signal and an end signal from the electronic telephone directory 15 to the operation unit 12. In this embodiment, as shown in FIG. 27, prior to transfer of telephone number information, the initialization signal is transmitted, and after transfer of the telephone number information, the end signal is transmitted.

Therefore, the operation unit 12 monitors inputs of signals by means of the light generation units PD1 to PD7 and the light reception units PT1 to PT7 after input of the initialization signal, thereby receiving telephone number information. Thus, the operation unit 12 sequentially stores the input numbers in a RAM 3.

In this case, when an input number is correct, two signals are always input, as shown in FIG. 26. A CPU 1 of the facsimile apparatus monitors this, thereby discriminating whether an input number is correct or an error input.

The electronic telephone directory mounting portion comprises a coupling switch SW9 for detecting whether or not the electronic telephone directory 15 is mounted. When a switch SW8 is enabled by the coupling switch SW9, the time-divisional signals C11 to C31 are supplied to the switches SW4 to SW7 of the key depression signals R11 to R41 when the electronic telephone directory 15 is mounted, thus allowing the dial input. In this embodiment, when the electronic telephone directory 15 is mounted, the dial input is allowed. As a result, an erroneous operation of the light reception units PT1 to PT7 caused by external light when the electronic telephone directory 15 is released can be prevented.

Figure 28:
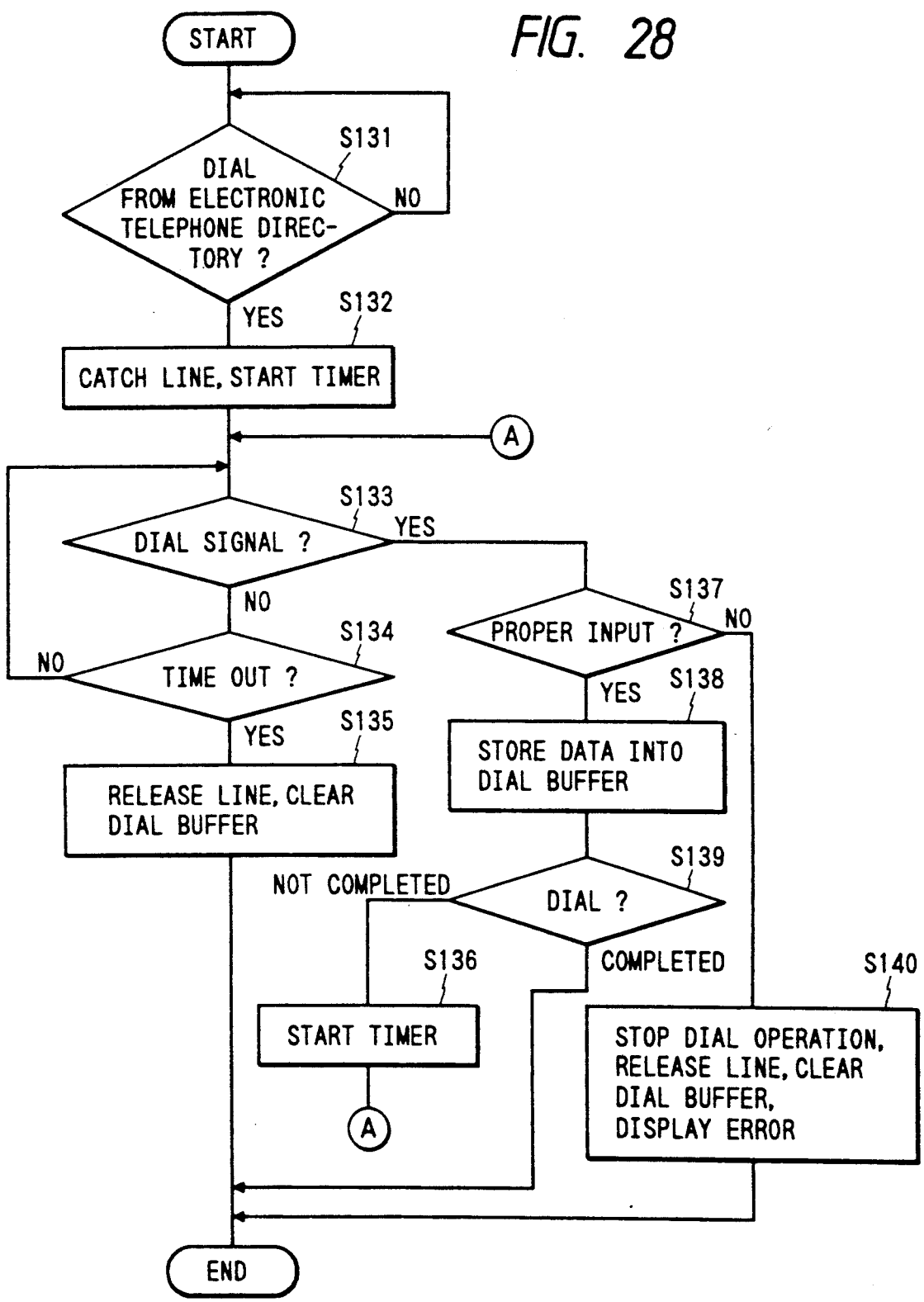
FIG. 28 is a flow chart of the tenth embodiment.

FIG. 28 is a flow chart for explaining an operation for performing call generation processing using the electronic telephone directory 15 with the above arrangement.

When call generation processing is performed using the electronic telephone directory 15, an operator switches a display of the display unit 105 to search and read out a destination to be called and its telephone number while the electronic telephone directory 15 is mounted on the electronic telephone directory mounting portion or before the electronic telephone directory 15 is mounted on the electronic telephone directory mounting portion.

When the transfer button is depressed while the electronic telephone directory 15 is mounted on the electronic telephone directory mounting portion, the telephone number displayed on the display unit 105 is sequentially transferred to the operation unit 12 after the initialization signal is transferred, and the input telephone number is then supplied from the operation unit 12 to the CPU 1.

When the CPU 1 detects input of the initialization signal (S131), it catches a line, and starts a timer (S132). This timer is used to end a call generation operation when no telephone number information is input within a predetermined period of time.

When the telephone number information is input from the electronic telephone directory 15 (S133), the CPU 1 checks based on the number of input signals if an input is correct or error, as described above. When an input error occurs due to external light or the like, the number of input signals exceeds 2, and the CPU 1 can determine an error.

Therefore, when the CPU 1 determines that the input signal is an error, it stops a dial operation, releases a line, clears a telephone number already stored in a dial buffer (RAM), and displays an error on the display unit 13 (S140).

When the CPU 1 determines that the input signal is correct, it stores telephone number information based on this input signal in the dial buffer (S138). If dial end data is not detected (S139), the CPU 1 restarts the timer (S136), and the flow returns to step S133 to wait for the next input.

When the timer is time over (S134) while no input signal is detected in step S133, the CPU 1 determines an error. Thus, the CPU 1 stops a dial operation, releases a line, and clears a telephone number already stored in the dial buffer, thus ending processing (S135).

Even in a communication apparatus other than a facsimile apparatus, the same call generation processing can be performed. In the above embodiment, when the number of input signals by the photocouplers is other than 2, an error is determined. Information may be transferred using three or more input signals. In addition, when the number of regular input signals for transferring information is two, and an extra input signal is detected, an error may be determined.

According to this embodiment, when the number of input signals by the photocouplers is other than a predetermined number, input information is determined as an error. Therefore, the light reception units of the photocouplers can perform an appropriate transfer operation from the electronic telephone directory 15 to the apparatus main body without being influenced by, e.g., external light.

This embodiment exemplifies a case wherein a signal is received from the electronic telephone directory as a light signal. However, the same effect as described above can be provided when a signal is received as an electrical signal.

Eleventh Embodiment

The arrangement of this embodiment is common to that shown in FIGS. 1 to 3.

A card 15 of this embodiment turns on/off 10 light generation elements 18 at predetermined timings, thereby transferring telephone number information and a check code (TNCC) to an operation unit 12. The check code is obtained by performing a predetermined calculation of the telephone number to be converted to a 4-digit numerical value. The check code is automatically added when a telephone number is registered in the card 15.

Ten light reception elements 19 corresponding to the light generation elements 18 of the card 15 are arranged on a card mounting portion 14. In addition, a microswitch 20 for detecting that the card 15 is mounted is arranged on the card mounting portion 14. When the microswitch 20 is depressed upon mounting of the card 15, the light reception elements 19 are set in a standby state.

When call generation processing is performed using the card 15 with the above arrangement, a display on a display unit 15a is switched to search and read out a destination to be called and its telephone number on the display unit 15a while the card 15 is mounted on the card mounting portion 14 or before the card 15 is mounted on the card mounting portion 14.

When a transfer button 16 is depressed while the card 15 is mounted on the card mounting portion 14, a telephone number displayed on the display unit 15a is sequentially transferred to the operation unit 12 upon light emission by the light generation elements 18, and the check code is then transferred to the operation unit 12 in turn. The transferred information is sent to a CPU 1 by the operation unit 12.

Figure 29:
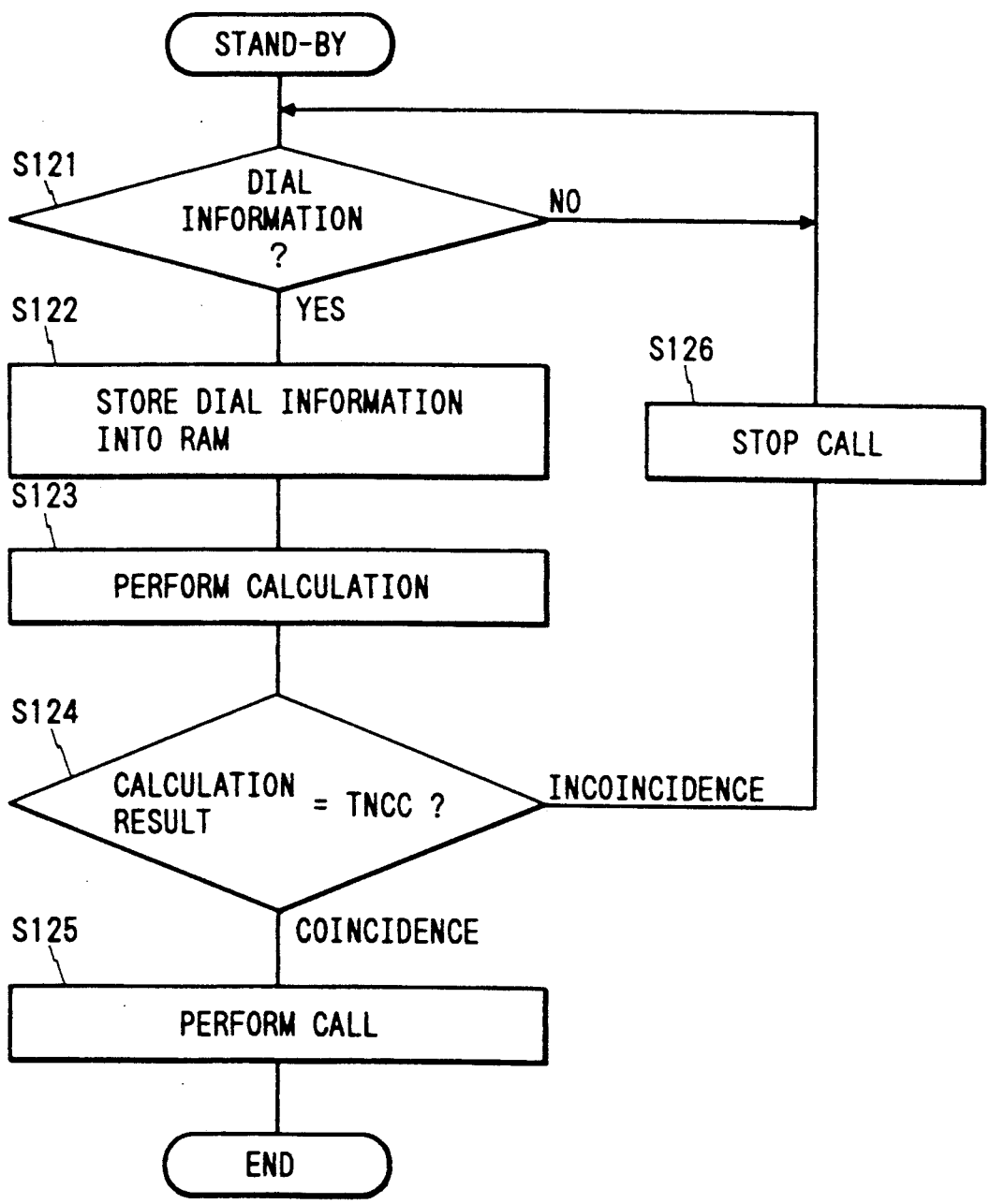
FIG. 29 is a flow chart of the eleventh embodiment.

FIG. 29 is a flow chart showing an operation of the facsimile apparatus in this case.

When the facsimile apparatus is set in a standby state, the CPU 1 periodically checks a state of the card mounting portion 14, and detects mounting of the card 15 upon depression of the microswitch 20. When a handset of a telephone set 11 is picked up or an off-hook button 17 is depressed, the CPU 1 controls an NCU 9 to set a line connection state.

When the transfer button 16 of the card 15 is depressed and telephone number information is input from the card 15 (S121), the CPU 1 sequentially stores the input numbers in a RAM 3 while analyzing them (S122).

The CPU 1 then performs the same calculation of the input telephone number information as in the card 15 to obtain the check code TNCC (S123). The CPU 1 then compares the calculated check code with the input check code (S124). When the two check codes coincide with each other, the CPU 1 determines a correct telephone number, reads out the telephone number stored in the RAM 3, and transmits it onto a telephone line 10 (S125).

When the calculated value in step S123 does not coincide with the input check code, the CPU 1 determines that the telephone number is illegal, and stops call generation processing. The CPU 1 then clears the telephone number stored in the RAM 3, disconnects a line (S126), and returns to a standby state.

In this manner, call generation processing can be performed only when a correct telephone number is transferred.

In the arrangement of this embodiment, since the light reception elements 19 of the card mounting portion 14 are set in a standby state when the card 15 is mounted, an erroneous operation caused by external light can be prevented.

Furthermore, it can be checked based on the check code input from the card 15 if telephone number information is correct. Thus, call generation processing can always be appropriately performed.

Even in a communication apparatus other than a facsimile apparatus, the same call generation processing can be performed.

The card is not limited to one employing an optical system, which transfers data in a non-contact manner but may be one employing an acoustic or electrical transfer system. The present invention is not limited to a so-called "card", but may be widely applied to a portable device as long as it has a memory function of telephone numbers.

Twelfth Embodiment

The schematic arrangement of an electronic telephone directory (memory card) of this embodiment is common to that shown in FIG. 25.

Figure 30:
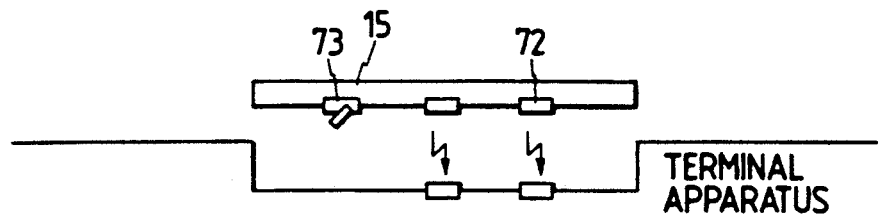
FIG. 30 is a sectional view of a card mounting portion of the twelfth embodiment.

FIG. 30 is a sectional view of a card mounting portion of this embodiment. In this manner, when a memory card is fitted in a terminal apparatus, the influence of external light can be removed.

This embodiment will be described in detail below.

Figure 31:
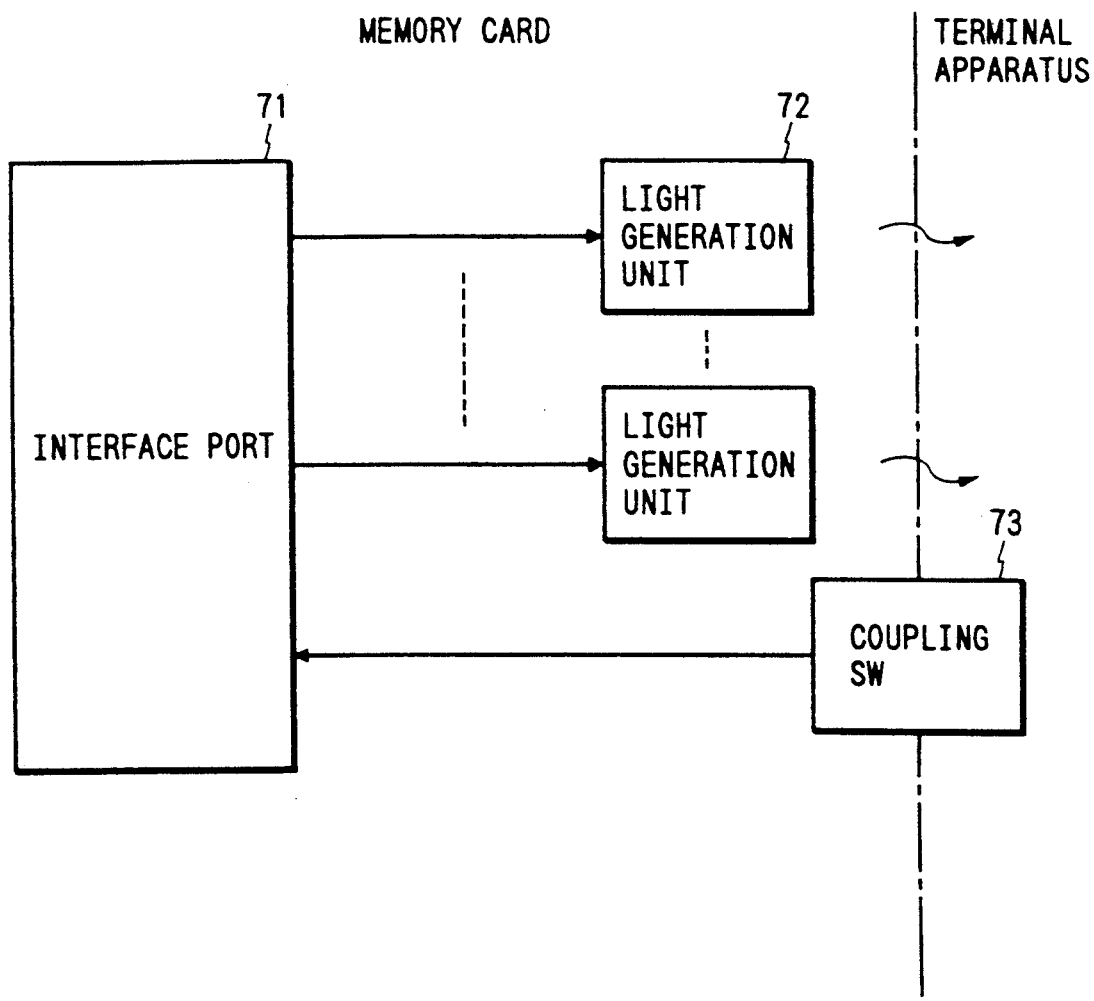
FIG. 31 is a block diagram of an interface unit of the twelfth embodiment.

FIG. 31 is a block diagram of an interface unit (107 in FIG. 25). An interface port 71 is an I/0 (input/output) port which is subjected to read/write access in response to an instruction from a CPU 101. An ON/OFF state of a light generation unit 72 is controlled by the output port. A switch 73 monitors coupling between a memory card and a terminal apparatus. An output signal of the switch 73 is input to the input port.

As shown in the timing chart of FIG. 32, in an actual operation, the CPU 101 monitors an ON/OFF state of the coupling switch 73 via the interface port 71, and when a memory card 15 is mounted on the terminal apparatus, it enables the interface output port. If a user depresses a key on an operation unit 106 to request data transfer to the terminal apparatus in this enable state, the CPU 101 transmits the data to the terminal apparatus via the light generation unit 72. When the coupling switch 73 is turned off, the output port of the interface port 71 is disabled, and the light generation unit 72 is inhibited from emitting light regardless of a data transmission request input by a key depression of a user.

As described above, when it is detected that the memory card is detached from the terminal apparatus, the interface port cf the memory card 15 is disabled, so that the battery of the memory card can be prevented from being wasted by an erroneous operation of a user.

Data to be transmitted from the memory card to the terminal apparatus includes a telephone number and a name, or an ID number for use restriction. A terminal which can receive an ID number includes a computer and a copying machine in addition to a communication apparatus.

Thirteenth Embodiment

In this embodiment, when a memory card is mounted on a terminal apparatus, an operative state is set without waiting for a switch depression by a user. Therefore, a user can save two steps of action, i.e., card mounting and switch depression.

When the memory card is removed from the terminal apparatus, a standby state is set without waiting for a depression of a switch at an operation unit 106 by a user. Therefore, a user can save two steps of action, i.e., card mounting and switch depression.

This embodiment will be described in detail below.

The arrangement of this embodiment is common to FIGS. 25, 30, and 31.

FIG. 33 is a timing chart of this embodiment.

A CPU 101 monitors an ON/OFF state of a coupling switch 73. As shown in the timing chart of FIG. 33, when the coupling switch 73 is turned on, i.e., when the memory card is mounted on the terminal apparatus, the CPU 101 causes a liquid crystal display constituting a display unit 105 to display data, and is set in an operative state. In this state, the CPU 101 displays transmission information according to key depressions on the operation unit 106.

When the coupling switch 73 is turned off, i.e., when the memory card 15 is released from the terminal apparatus, the CPU 101 detects this, turns off the liquid crystal display of the display unit 105, and is set in a standby state, thus preserving a memory 103.

As described above, when a user mounts the memory card 15 on the terminal apparatus to use it, the memory card is set in the operative state, and the user can immediately perform the next operation. When the user detaches the memory card from the apparatus, since the memory card is automatically set in the standby state, the user need not depress a switch again, and a battery can be prevented from being wasted when the user forgets to turn off the card.

In the standby state, a timepiece mode may be set to display current time, and in the operative state, a search mode may be set to search storage data according to key inputs.

Fourteenth Embodiment

The overall arrangement of a memory card of this embodiment is common to that shown in FIG. 25.

Figure 34:
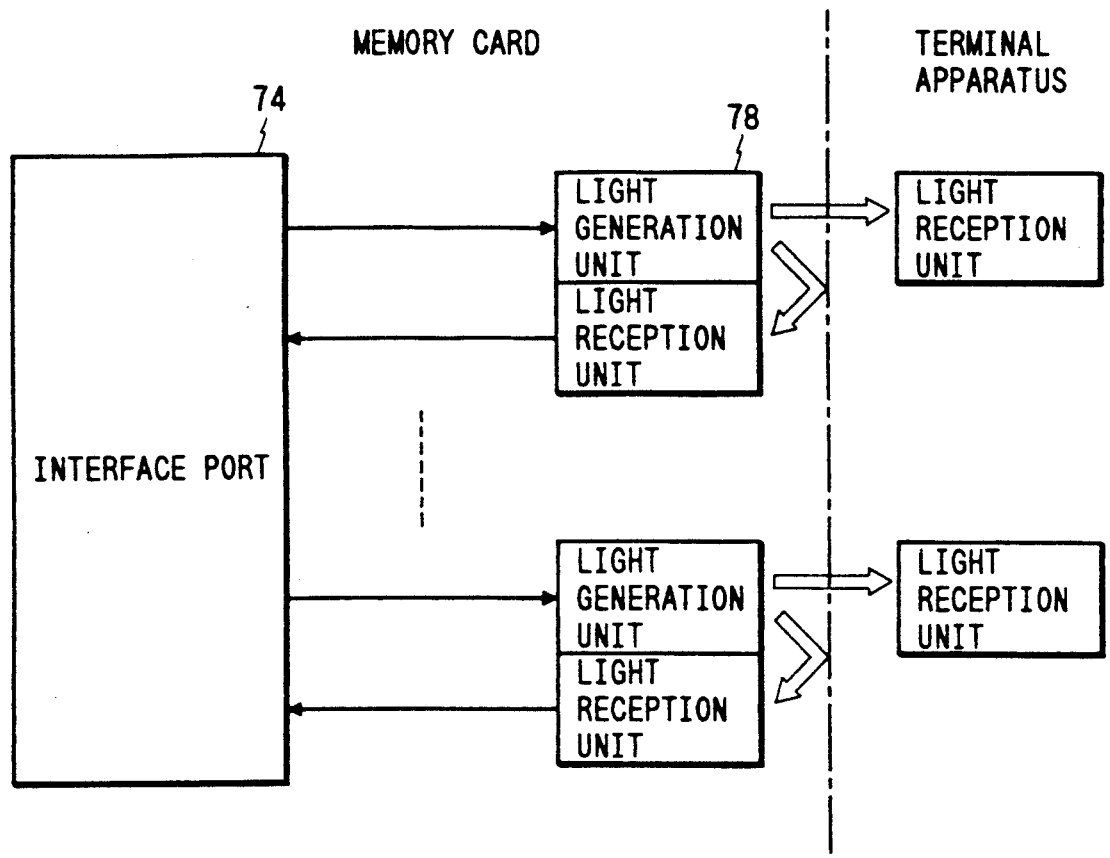
FIG. 34 is a block diagram of an interface unit of the fourteenth embodiment.
Figure 35:
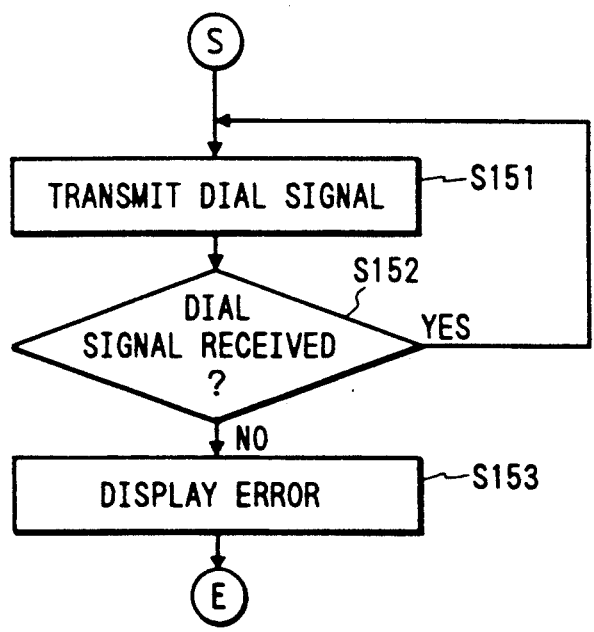
FIG. 35 is a flow chart of signal transmission processing of the fourteenth embodiment.

FIG. 34 is a block diagram of an interface unit 107. FIG. 35 is a flow chart of a dial signal transmission program. An I/0 port 74 interfaces with a CPU. A reflection type photosensor 78 comprises a light generation unit and a light reception unit, which are packed in one package. Light emitted from the light generation unit is incident on a light reception unit of a terminal apparatus, and is reflected by the outer wall of the terminal apparatus and becomes incident on the light reception unit of the photosensor 78 itself. When a memory card 15 and the terminal apparatus are separated beyond a predetermined distance, the light reception unit of the terminal apparatus cannot satisfactorily receive a signal. In this case, the light reception unit of the photosensor 78 cannot receive a signal, either.

FIG. 35 is a flow chart of a CPU 101. In step S151, a dial signal is transmitted, and it is checked in step S152 if the light reception unit paired with the light generation unit which transmits the signal detects the dial signal. If YES in step S152, the next dial operation is started; otherwise, an error message is displayed on a display unit 105.

As described above, a light interface portion of the memory card comprises the reflection type photosensor, and a signal transmitted from the light generation unit is checked by its own light reception unit. Therefore, it can be determined whether or not the memory card is satisfactorily mounted on the terminal apparatus upon every transmission of a signal.

Data to be transmitted from the memory card to the terminal apparatus includes a telephone number and a name, or an ID number for use restriction. A terminal which can receive an ID number includes a computer and a copying machine in addition to a communication apparatus.

The preferred embodiments of the present invention have been described. However, the present invention is not limited to the arrangements of the above embodiments, and various other changes and modifications may be made within the spirit and scope of the appended claims.

What is claimed is:

1. A call generation apparatus comprising:
   means for mounting a portable device;
   connecting means for connecting a call communication line; and
   call generation means for generating a call to the call communication line which has been connected by said connecting means, according to information received from said portable device,
   wherein said connecting means disconnects the call communication line which has been connected, when said portable device is unmounted during the reception of the information from said portable device.

2. An apparatus according to claim 1, wherein said call generation means comprises means for converting light information generated by said portable device into an electrical signal.

3. An apparatus according to claim 1, wherein said call generation means comprises storage means for storing the information received from said portable device, and clears said storage means when said portable device is unmounted.

4. An apparatus according to claim 1, wherein said call generation means does not disconnect the call communication line when said portable device is unmounted after receiving the information from said portable device.

5. An apparatus according to claim 1, wherein said call generation means connects the call communication line according to the information received from said portable device.

6. An apparatus according to claim 1, wherein said call generation means comprises receiving means for receiving the information from said portable device, detecting means for detecting that said portable device is unmounted, and connected means for connecting the call communication line, and said connecting means disconnects the call communication line when said detecting means detects that said portable device is unmounted while receiving means is receiving the information.

7. An apparatus according to claim 6, said detecting means comprises a mechanical switch.

8. A call generation apparatus for generating a call according to a light generated by a portable device which is mounted on said apparatus, said apparatus comprising:
light reception means;
connecting means for connecting a call communication line; and
call generation means for generating a call to the call communication line which has been connected by said connecting means, according to an output from said light reception means,
wherein said connecting means disconnects the call communication line when said portable device is unmounted during reception of the light by said light reception means.

9. An apparatus according to claim 8, wherein said call generation means comprises memory means for storing information received from said portable device and generates the call according to the stored information.

10. An apparatus according to claim 9, wherein said call generation means clears the stored information when said portable device is unmounted during reception of the information from said portable device.

11. An apparatus according to claim 8, wherein said call generation means ignores an output from said light reception means when the portable device is unmounted during reception of a light be said light reception means.

12. An apparatus according to claim 8, wherein said call generation means comprises detecting means for detecting that said portable device is unmounted and connecting means for connecting the call communication line after the information is received by said light reception means, and
said connecting means does not connect the call communication line when said detecting means detects that said portable device is unmounted while said light reception means is receiving the light.

13. An apparatus according to claim 12, wherein said detecting means comprises a mechanical switch.

14. An apparatus according to claim 8, wherein said light reception means receives the light generated by said portable device.

15. A call generation apparatus comprising:
means for mounting a portable device;
sending means for sending a permission signal to said portable device for permitting said portable device to transmit information before the information is received; and
call generation means for generation a call according to the information received from said portable device after said sending means sends the permission signal.

16. An apparatus according to claim 15, wherein said sending means comprises light generation means for emitting a light.

17. An apparatus according to claim 15, wherein said sending means send the permission signal when a call communication line receives a line activating signal.

18. An apparatus according to claim 15, wherein the information includes a dial number.

19. A call generation apparatus comprising:
means for mounting a portable device;
connection means for connecting, according to a mounting of the portable device on said mounting means, a call communication line even if no information has been received from the portable device; and
call generation means for generating a call according to any information received from said portable device.

20. An apparatus according to claim 19, wherein said call generation means comprises means for converting light information generated by said portable device into an electrical signal.

21. A call generation system including a call generation apparatus and a portable device,
wherein said call generation apparatus comprises first sending means for sending a permission signal to said portable device, and
said portable device comprises second sending means for sending call data to said call generation apparatus, in response to the permission signal,
wherein said call generation apparatus further comprises call generation means for generating a call according to the call data.

22. A system according to claim 21, wherein said first sending means includes light generation means.

23. A system according to claim 21, wherein said second sending means includes light generation means.

24. A system according to claim 21, wherein said first sending means sends the permission signal when a call communication line receives an off-hook state signal.

25. A system according to claim 21, wherein the call data includes a dial number.

26. A system according to claim 21, wherein said call generation means detects the call data after said first sending means sends the permission signal.

* * * * *

UNITED STATES PATENT AND TRADEMARK OFFICE
CERTIFICATE OF CORRECTION

PATENT NO. : 5,283,826
DATED : February 1, 1994
INVENTOR(S) : YUJI KUROSAWA ET AL.

Page 1 of 2

It is certified that error appears in the above-identified patent and that said Letters Patent is hereby corrected as shown below:

TITLE PAGE:
AT [56] REFERENCES CITED

Foreign Patent Documents,
"63-104556 10/1988 Japan
  63-006946 12/1988 Japan"   should read
--63-104556  5/1988 Japan
  63-006946  1/1988 Japan--.

U.S. Patent Documents,
"Skerbs et al." should read --Skerlos et al.--.

COLUMN 10

Line 3, "delayed" should read --delayed.--.

COLUMN 14

Line 44, "error," should read --in error,--.

COLUMN 17

Line 1, "cf" should read --of--.

UNITED STATES PATENT AND TRADEMARK OFFICE
CERTIFICATE OF CORRECTION

PATENT NO. : 5,283,826
DATED : February 1, 1994
INVENTOR(S) : YUJI KUROSAWA ET AL.

It is certified that error appears in the above-identified patent and that said Letters Patent is hereby corrected as shown below:

<u>COLUMN 19</u>

Line 35, "be" should read --by--.

Signed and Sealed this

Thirteenth Day of September, 1994

Attest:

BRUCE LEHMAN

Attesting Officer  Commissioner of Patents and Trademarks